US008139087B2

(12) United States Patent
Kuroki et al.

(10) Patent No.: US 8,139,087 B2
(45) Date of Patent: Mar. 20, 2012

(54) IMAGE PRESENTATION SYSTEM, IMAGE PRESENTATION METHOD, PROGRAM FOR CAUSING COMPUTER TO EXECUTE THE METHOD, AND STORAGE MEDIUM STORING THE PROGRAM

(75) Inventors: Tsuyoshi Kuroki, Kawasaki (JP); Sonoko Maeda, Kawasaki (JP); Kazuki Takemoto, Kawasaki (JP); Yasuo Katano, Kawasaki (JP); Yasuhiro Okuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 11/476,462

(22) Filed: Jun. 28, 2006

(65) Prior Publication Data

US 2007/0002037 A1 Jan. 4, 2007

(30) Foreign Application Priority Data

Jul. 1, 2005 (JP) ................................ 2005-193825
Jun. 12, 2006 (JP) ................................ 2006-162577

(51) Int. Cl.
*G09G 5/00* (2006.01)
(52) U.S. Cl. .................... 345/633; 345/419; 345/629
(58) Field of Classification Search .......... 345/629–641, 345/1.1–3.4, 7–8, 173
See application file for complete search history.

(56) References Cited

U.S. PATENT DOCUMENTS

| 5,892,509 A * | 4/1999 | Jakobs et al. ................. 715/751 |
| 6,522,312 B2 * | 2/2003 | Ohshima et al. .................. 345/8 |
| 6,638,223 B2 * | 10/2003 | Lifshitz et al. ................ 600/440 |
| 6,963,334 B1 * | 11/2005 | Stevens et al. ................ 345/179 |
| 2002/0049510 A1 * | 4/2002 | Oda et al. ....................... 700/114 |
| 2004/0109009 A1 * | 6/2004 | Yonezawa et al. ............. 345/632 |
| 2004/0140949 A1 * | 7/2004 | Takagi ............................... 345/8 |
| 2004/0145594 A1 * | 7/2004 | Kobayashi et al. ........... 345/633 |
| 2004/0189675 A1 * | 9/2004 | Pretlove et al. ............... 345/633 |

(Continued)

FOREIGN PATENT DOCUMENTS

EP 1117074 A2 * 7/2001

(Continued)

OTHER PUBLICATIONS

Szalavari et al., Studierstube: An Environment for Collaboration in Augmented Reality, Mar. 1998, Springer London, Virtual Reality 3, pp. 37-48.*
Uchiyama et al., MR Platform: A Basic Body on Which Mixed Reality Applications Are Built, 2002, Proceedings of the International Symposium on Mixed and Augmented Reality, pp. 1-8.*
Poupyrev et al., Tiles: A Mixed Reality Authoring Interface, Jul. 2001, International Conference on Human-Computer Interaction, pp. 1-8.*

(Continued)

*Primary Examiner* — Xiao M. Wu
*Assistant Examiner* — Charles Tseng
(74) *Attorney, Agent, or Firm* — Cowan, Liebowitz & Latman, P.C.

(57) ABSTRACT

An image presentation system which enables a user observing an image on a first display to recognize an instruction sent from a person seeing an image on a second display to the user. An HMD as the first display detects the position and orientation of the HMD and presents an image to the user. The second display presents an image to the person who gives an instruction to the user. A three-dimensional CG drawing device draws a virtual space image seen from a point of view corresponding to the position and orientation of the HMD and displays the virtual space image on the HMD and the second display. When receiving the instruction, the three-dimensional CG drawing device draws a virtual space image to be displayed on the HMD such that the virtual space image reflects the input instruction.

2 Claims, 19 Drawing Sheets

U.S. PATENT DOCUMENTS

| | | | |
|---|---|---|---|
| 2005/0024388 A1* | 2/2005 | Takemoto | 345/633 |
| 2005/0231530 A1* | 10/2005 | Liang et al. | 345/619 |
| 2006/0170652 A1* | 8/2006 | Bannai et al. | 345/156 |
| 2006/0227151 A1* | 10/2006 | Bannai | 345/633 |

FOREIGN PATENT DOCUMENTS

| | | | |
|---|---|---|---|
| JP | 10-091057 A | 4/1998 | |
| JP | 2001-109912 A | 4/2001 | |
| JP | 2001-195601 A | 7/2001 | |
| JP | 2002-159019 | 5/2002 | |
| JP | 2002-538543 A | 11/2002 | |
| JP | 2003-270719 A | 9/2003 | |
| JP | 2004-194033 A | 7/2004 | |
| JP | 2005-049996 A | 2/2005 | |
| JP | 2005-135161 A1 | 5/2005 | |

OTHER PUBLICATIONS

Splechtna et al., ARAS—Augmented Reality Aided Surgery System Description, VRVis Research Center Technical Report TR-VRVis-2002-040, http://vrvis.at/TR/2002/TR_VRVis_2002_040_Full.pdf (Internet Archive), accessed Nov. 28, 2003.*

Yushi Suzuki et al., Remote Cooperative Work Support System in MR Space, Jun. 1, 2006 (5 pages).

The above references were cited in a Jun. 10, 2011 Japanese Office Action, which is enclosed without an English Translation, that issued in Japanese Patent Application No. 2006-162577.

The above references were cited in a Sep. 13, 2011 Japanese Office Action, which is enclosed without an English Translation, that issued in Japanese Patent Application No. 2006-162577.

* cited by examiner

IMAGE PRESENTATION SYSTEM, IMAGE PRESENTATION METHOD, PROGRAM FOR CAUSING COMPUTER TO EXECUTE THE METHOD, AND STORAGE MEDIUM STORING THE PROGRAM

BACKGROUND OF THE INVENTION

1. Field of the Invention

The present invention relates to an image presentation system and an image presentation method which use a first display for presenting images to a user and a second display for presenting images to a user (person who instructs) who is different from the user of the first display, as well as a program for causing a computer to execute the method and a storage medium storing the program.

2. Description of the Related Art

VR (Virtual Reality) systems present three-dimensional CG (Computer Graphic) images created by a computer to a user so that the user can feel as if a virtual space were a reality space.

Also, the technique of synthesizing an image of a reality space with three-dimensional CG animation so as to present information which does not exist in a reality space to a user has been recently developed. Such a technique is referred to as an MR (Mixed Reality) system. The MR system, which is intended for the coexistence of a reality space and a virtual space which could be experienced only in isolation from the reality space, receives widespread attention since it can enhance a virtual space.

A typical example of an apparatus which can realize a system intended for the coexistence of a virtual space and a reality space (VR/MR system) is a Head Mounted Display (HMD). In the VR/MR system, a virtual space and a mixed reality space are displayed on the HMD so as to present the virtual space and the mixed reality space to a user who wears the HMD (see Japanese Laid-Open Patent Publication (Kokai) No. 2002-159019, for example).

Such a VR/MR system presents a virtual space and a mixed reality space to only the HMD wearing user. For this reason, an image displayed on the HMD (subjective image) is distributed to be displayed on a different screen so that the virtual space/mixed reality space presented to the HMD wearing user can be presented to a user who does not wear the HMD.

There may be a case where a subjective image seen by the HMD wearer is displayed on a different screen so as to be presented to the non-HMD wearer, and a case where the non-HMD wearer intends to give an instruction to the HMD wearer. For example, the non-HMD wearer indicates a part on the different screen and instructs the HMD wearer to get closer to the indicated part since the non-HMD wearer intends to see the indicated part in further detail. However, even if the non-HMD wearer indicates a part on the different screen, an image displayed on the HMD does not change, and hence the HMD wearer cannot detect the action of the non-HMD wearer. Also, even if the HMD wearer turns his/her eyes to the different screen and tries to recognize the instruction given by the non-HMD wearer, the view displayed on the different screen changes at the same instant, and hence the HMD wearer cannot recognize the instruction given by the non-HMD wearer even if the HMD wearer sees the different screen.

Also, in the situation where a subjective image seen by the HMD wearer is displayed on the different screen so as to be presented to the non-HMD wearer, there may be a case where the non-HMD wearer is annoyed with sway of the view displayed on the different screen when the HMD wearer's head swings. To avoid this, the HMD wearer has to fix his/her point of view by, for example, stopping his/her head, and this imposes a burden on the HMD wearer.

It is an object of the present invention to provide an image presentation system and an image presentation method which enable a user observing an image on a first display to recognize an instruction sent from a user seeing an image on a second display to the user observing the image on the first display, as well as a program for causing a computer to execute the method and a storage medium storing the program.

SUMMARY OF THE INVENTION

To attain the above object, in a first aspect of the present invention, there is provided an image presentation system comprising a first display that comprises a detecting device that detects a position and orientation of the first display and presents an image to a user, a second display that presents an image to a person who gives an instruction to the user, a drawing device that draws a virtual space image seen from a point of view corresponding to the position and orientation of the first display and displays the virtual space image on the first display and the second display, and an input device that inputs an instruction from the person to the user, wherein, when the instruction from the person to the user is input to the drawing device via the input device, the drawing device draws a virtual space image to be displayed on the first display such that the virtual space image reflects the instruction from the person to the user input via the input device.

To attain the above object, in a second aspect of the present invention, there is provided an image presentation system comprising a first display that comprises a detecting device that detects a position and orientation of the first display and presents an image to a user, a first drawing device that draws a virtual space image seen from a point of view corresponding to the position and orientation of the first display and displays the virtual space image on the first display, an image pickup device that acquires an image seen from a third party's point of view, a second drawing device that draws a virtual space image seen from a point of view corresponding to a position and orientation of the image pickup device and generates the virtual space image, a second display that presents the virtual space image generated by the second drawing device to a person who gives an instruction to the user, and an input device that inputs an instruction from the person to the user, wherein, when the instruction from the person to the user is input to the first drawing device via the input device, the first drawing device draws a virtual space image to be displayed on the first display such that the virtual space image reflects the instruction from the person to the user input via said input device.

To attain the above object, in a third aspect of the present invention, there is provided an image presentation system comprising a first display that presents an image to a user, a detecting device that detects a position and orientation of the first display, a second display that presents an image to a person who gives an instruction to the user, a drawing device that draws a virtual space image based on the position and orientation of the first display detected by the detecting device and displays the virtual space image on the first display and the second display, and an input device that inputs an instruction indicative of a position of the virtual space image displayed on the second display, wherein, when the instruction indicative of the position of the virtual space image displayed on the second display is input via the input device, the drawing device draws a virtual space image to be displayed on the first display such that the virtual space image reflects the instruction input via the input device.

To attain the above object, in a fourth aspect of the present invention, there is provided an image presentation system comprising a first display that presents an image to a user, a detecting device that detects a position and orientation of the first display, a second display that presents an image to a person who gives an instruction to the user, an image pickup device that acquires an image seen from a third party's point of view, a first drawing device that draws a virtual space image based on the position and orientation of the first display detected by the detecting device and displays the virtual space image on the first display, a second drawing device that draws a virtual space image based on a position and orientation of the image pickup device and displays the virtual space image on the second display, and an input device that inputs an instruction indicative of a position of the virtual space image displayed on the second display, wherein, when the instruction indicative of the position of the virtual space image displayed on the second display is input the input device, the first drawing device draws a virtual space image to be displayed on the first display such that the virtual space image reflects the instruction input via the input device.

To attain the above object, in a fifth aspect of the present invention, there is provided an image presentation method using a first display that comprises a detecting device that detects a position and orientation of the first display and presents an image to a user, and a second display that presents an image to a person who gives an instruction to the user, comprising a drawing step of drawing a virtual space image seen from a point of view corresponding to the position and orientation of the first display and displaying the virtual space image on the first display and the second display, and an input step of inputting the instruction from the person to the user, wherein, in the drawing step, when the instruction from the person to the user is input in the input step, a virtual space image to be displayed on the first display is drawn such that the virtual space image reflects the instruction from the person to the user input in the input step.

To attain the above object, in a sixth aspect of the present invention, there is provided an image presentation method using a first display that comprises a detecting device that detects a position and orientation of the first display and presents an image to a user, a second display that presents an image to a person who gives an instruction to the user, and an image pickup device that acquires an image seen from a third party's point of view, comprising a first drawing device of drawing a virtual space image seen from a point of view corresponding to the position and orientation of the first display and displaying the virtual space image on the first display, a second drawing step of drawing a virtual space image seen from a point of view corresponding to a position and orientation of the image pickup device and displaying the virtual space image on the second display, and an input step of inputting an instruction from the person to the user, wherein, in the first drawing step, when the instruction from the person to the user is input in the input step, a virtual space image to be displayed on the first display is drawn such that the virtual space image reflects the instruction from the person to the user input in the input step.

To attain the above object, in a seventh aspect of the present invention, there is provided an image presentation method comprising a detecting step of detecting a position and orientation of a first display that presents an image to a user, a drawing step of drawing a virtual space image based on the position and orientation of the first display detected in the detecting step, a displaying step of displaying the virtual space image on the first display and a second display that presents an image to a person who gives an instruction to the user, and an input step of inputting an instruction indicative of a position of the virtual space image displayed on the second display, wherein, in the drawing step, when the instruction indicative of the position of the virtual space image displayed on the second display is input in the input step, a virtual space image to be displayed on the first display is drawn such that the virtual space image reflects the instruction input in the input step.

To attain the above object, in an eighth aspect of the present invention, there is provided a program for causing a computer to execute an image presentation method for controlling an image presentation system using a first display that comprises a detecting device that detects a position and orientation of the first display and presents an image to a user, and a second display that presents an image to a person who gives an instruction to the user, comprising a drawing module for drawing a virtual space image seen from a point of view corresponding to the position and orientation of the first display and displaying the virtual space image on the first display and the second display, and at least one input module for inputting an instruction from the person to the user, wherein, when the instruction from the person to the user is input by the input module, the drawing module draws a virtual space image to be displayed on the first display such that the virtual space image reflects the instruction from the person to the user input via the input module.

To attain the above object, in a ninth aspect of the present invention, there is provided a program for causing a computer to execute an image presentation method, comprising a detecting module for detecting a position and orientation of a first display that presents an image to a user, a drawing module for drawing a virtual space image based on the position and orientation of the first display detected by the detecting module, a displaying module for displaying the virtual space image on the first display and a second display that presents an image to a person who gives an instruction to the user, and an input module for inputting an instruction indicative of a position of the virtual space image displayed on the second display, wherein, when the instruction indicative of the position of the virtual space image displayed on the second display is input by the input module, the drawing module draws a virtual space image to be displayed on the first display such that the virtual space image reflects the instruction input by the input module.

To attain the above object, in a tenth aspect of the present invention, there is provided a computer-readable storage medium storing a program for causing a computer to execute an image presentation method for controlling an image presentation system using a first display that comprises a detecting device that detects a position and orientation of the first display and presents an image to a user, and a second display that presents an image to a person who gives an instruction to the user, comprising a drawing module for drawing a virtual space image seen from a point of view corresponding to the position and orientation of the first display and displaying the virtual space image on the first display and the second display, and at least one input module for inputting an instruction from the person to the user, wherein, when the instruction from the person to the user is input by the input module, the drawing module draws a virtual space image to be displayed on the first display such that the virtual space image reflects the instruction from the person to the user input via the input module.

According to the present invention, a user observing an image on the first display can recognize an instruction sent from a user seeing an image on the second display (user who instructs) to the user observing the image on the first display.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
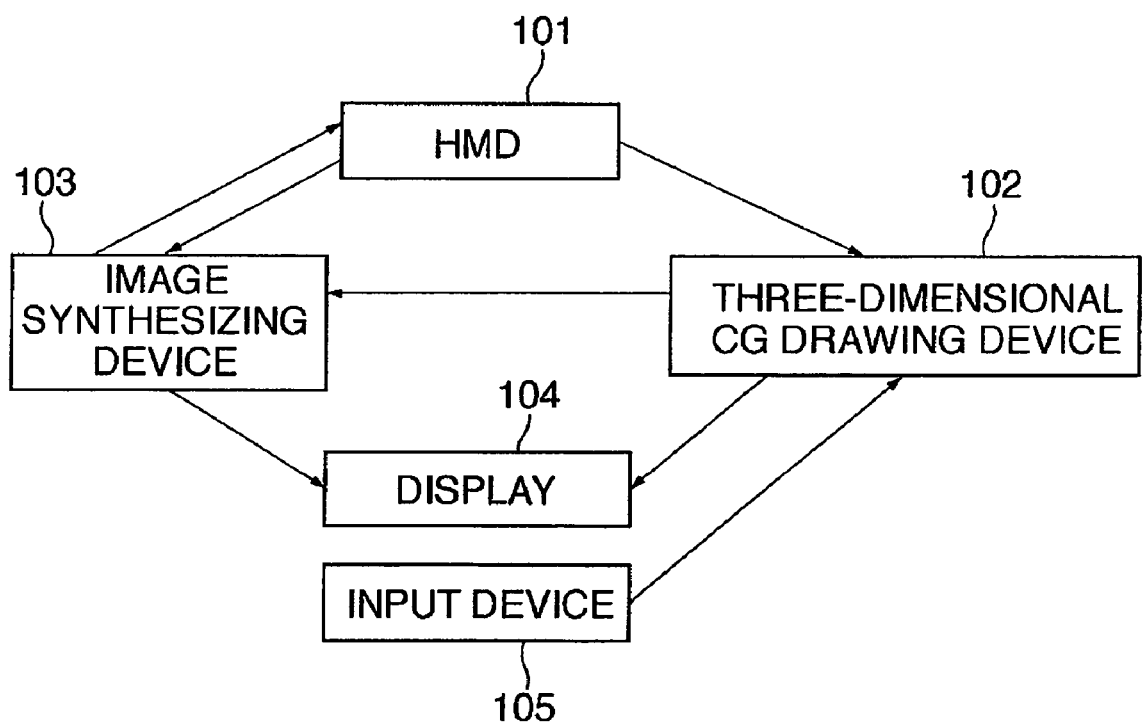
FIG. 1 is a block diagram showing the arrangement of an image presentation system according to a first embodiment of the present invention.

FIG. 1 is a block diagram showing the arrangement of an image presentation system according to a first embodiment of the present invention.

As shown in FIG. 1, the image presentation system is comprised of an HMD 101, a three-dimensional CG drawing device 102, an image synthesizing device 103, a display 104, and an input device 105.

The HMD 101 is comprised of an image pickup section, a pair of display sections, and a sensor section, which are not illustrated. The image pickup section picks up an image seen from the viewpoint of a person who wears the HMD 101 (HMD wearer). The picked-up image is sent to the image synthesizing device 103. The pair of display sections are arranged in front of the right and left eyes, respectively, of the HMD wearer and display the image sent from the image synthesizing device 103. On the right and left display sections, the same image picked up by one image pickup section may be displayed, or images with different parallaxes picked up by two image pickup sections may be displayed. In the case where images with different parallaxes are displayed on the right and left display sections, two three-dimensional CG drawing devices and two image synthesizing devices have to be provided in the image presentation system for the right and left eyes.

The sensor section detects the position and orientation of the HMD 101 and sends position-and-orientation information indicative of the detected position and orientation to the three-dimensional CG drawing devices 102. The sensor section is not limited in its sensing configuration so long as it is capable of detecting the position and orientation of the HMD 101. For example, the sensor section may be implemented by a magnetic sensor. Alternatively, the HMD 101 may be externally equipped with an optical sensor so that the position and orientation of the HMD 101 can be detected based on an output from the optical sensor. Still alternatively, the image synthesizing device 103 may calculate the position and orientation of the HMD 101 based on an image sent from the HMD 101 to detect the position and orientation of the HMD 101.

The three-dimensional CG drawing device 102 stores information on a virtual world therein. The three-dimensional CG drawing device 102 draws a CG image of the virtual world which can be seen from the position of the HMD 101 based on the position-and-orientation information sent from the HMD 101 and sends the drawn CG image to the image synthesizing device 103. The three-dimensional CG drawing device 102 is implemented by a computer, for example.

The image synthesizing device 103 generates a synthesized image by synthesizing the image sent from the HMD 101 and the CG image sent from the three-dimensional CG drawing device 102. The synthesized image thus generated is sent to the HMD 101 and the display 104. In the case where images with different parallaxes are sent to the HMD 101, one of those images for the right eye and the left eye is displayed on the display 104. The image synthesizing device 103 is implemented by, for example, a computer equipped with an image capture card. This computer which implements the image synthesizing device 103 may also serve as a computer which implements the three-dimensional CG drawing device 102.

To present the synthesized image sent from the image synthesizing device 103 to a person who does not wear the HMD 101 (non-HMD wearer), the display 104 displays the synthesized image. The display 104 is implemented by a liquid crystal display, for example.

The input device 105 inputs an input operation carried out by the non-HMD wearer so as to give an instruction to the HMD wearer and sends input information corresponding to the input operation to the three-dimensional CG drawing device 102. The input device 105 is implemented by, for example, a touch panel attached to the screen of the display 104.

Figure 2:
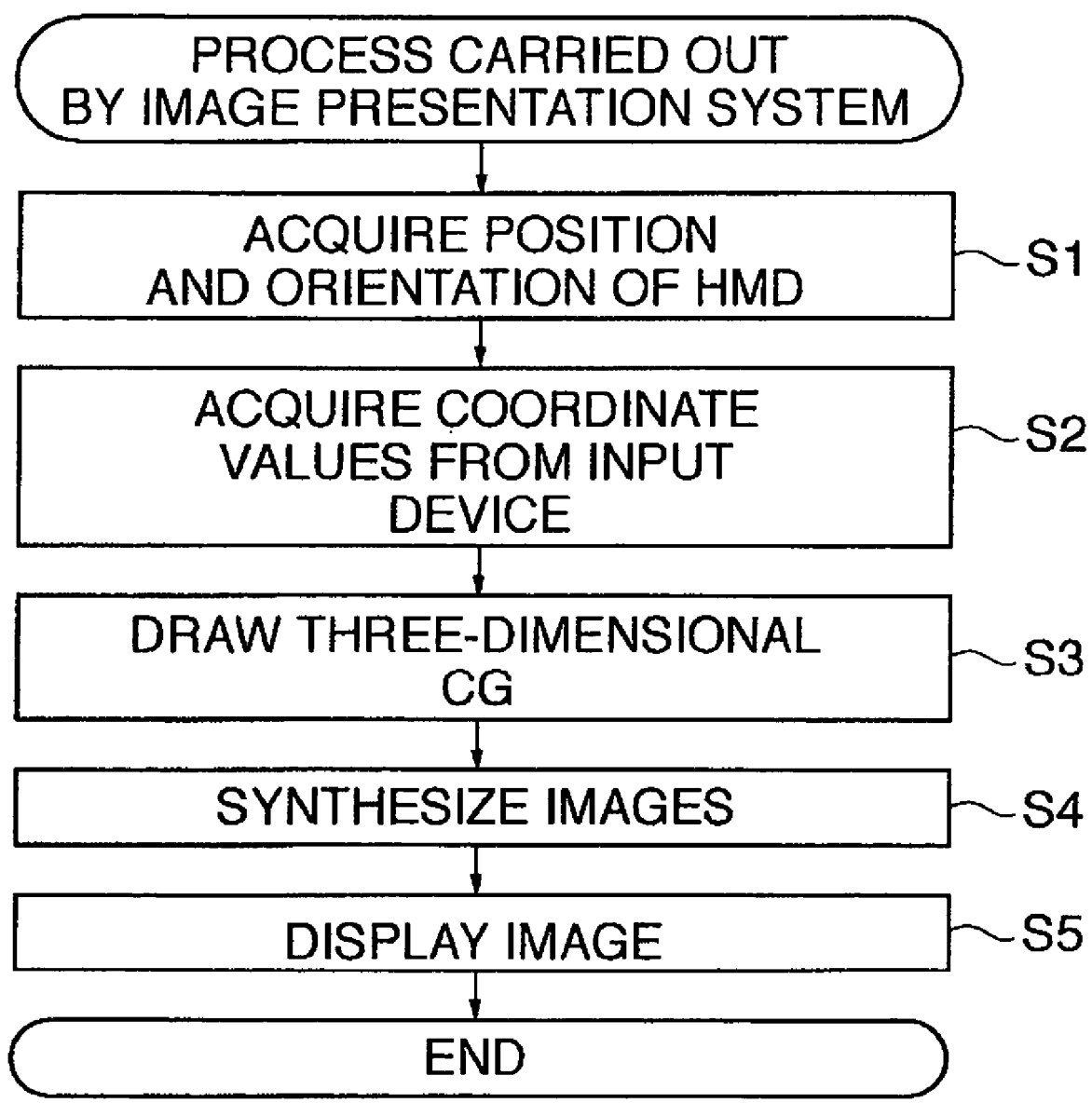
FIG. 2 is a flow chart showing the procedure of a process carried out by the image presentation system in FIG. 1.

Referring next to FIG. 2, a description will be given of a process carried out by the image presentation system according to the present embodiment.

FIG. 2 is a flow chart showing the procedure of the process carried out by the image presentation system in FIG. 1. The flow chart of FIG. 2 includes procedures carried out by the respective ones of the three-dimensional CG drawing device 102 and the image synthesizing device 103 in accordance with programs stored in the respective ones of the three-dimensional CG drawing device 102 and the image synthesizing device 103.

First, in the image presentation system according to the present embodiment, the three-dimensional CG drawing device 102 acquires information on the position and orientation of the HMD 101 in a step S1. Next, in a step S2, the three-dimensional CG drawing device 102 receives input information corresponding to an input operation by the non-HMD wearer 101 via the input device 105. In the present embodiment, the input device 105 is implemented by a touch panel attached to the screen of the display 104, and hence the input operation involves touching a desired position on the screen of the display 104 by the hand of the non-HMD wearer. In this case, the three-dimensional CG drawing device 102 acquires the coordinate values of the position on the screen touched by the hand of the non-HMD wearer.

Next, in a step S3, the three-dimensional CG drawing device 102 draws a CG image of a virtual world, which is seen from the position of the HMD 101, on the screen of the HMD 101 based on information on the virtual world stored in the three-dimensional CG drawing device 102 as well as the information on the position and orientation of the HMD 101 acquired from the HMD 101. Also, based on the coordinate values acquired from the input device 105, the three-dimensional CG drawing device 102 finds a three-dimensional position in the virtual world corresponding to the position represented by the coordinate values. On this occasion, examples of methods to find a three-dimensional position in the virtual world corresponding to a position represented by given coordinate values include a method in which a virtual ray of light extending from a point of view toward the position represented by the given coordinate values is set and a point at which this ray of light intersects for the first time an object existing in a virtual world is obtained as a three-dimensional position corresponding to the given coordinate values. The CG image is drawn at the position obtained in the above mentioned manner, and the drawn CG image is sent to the image synthesizing device 103.

Next, in a step S4, the image synthesizing device 103 acquires an image picked up by the image pickup section of the HMD 101 from the HMD 101 and synthesizes the acquired image and the CG image sent from the three-dimensional CG drawing device 102. The resultant synthesized image is sent to the HMD 101 and the display 104.

Next, in a step S5, the HMD 101 and the display 104 display the synthesized image. Consequently, the HMD wearer can recognize the position indicated by the non-HMD wearer. In the case where the right and left display sections of the HMD 101 display images with different parallaxes, the HMD wearer can stereoscopically recognize the position of a pointer object 601 (see FIG. 6; described later in detail) from a three-dimensional perspective. The non-HMD wearer who is seeing the display 104 can recognize that an object, e.g. the pointer object 601 (see FIG. 6; described later in detail) is displayed at the position indicated by his/her hand.

Figure 3:
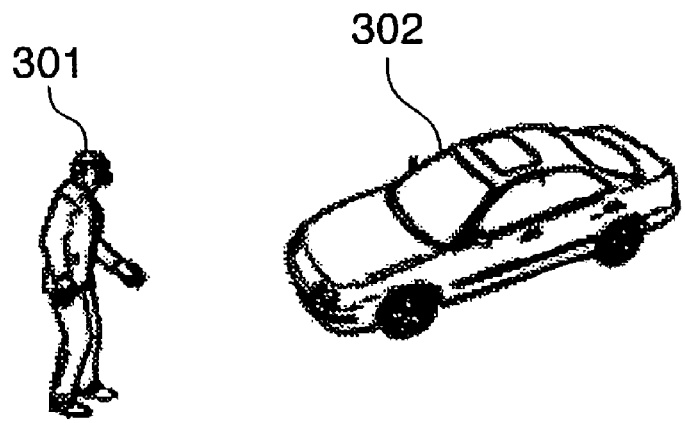
FIG. 3 is a view showing a state in which an HMD wearer is observing a virtual automobile.
Figure 4:
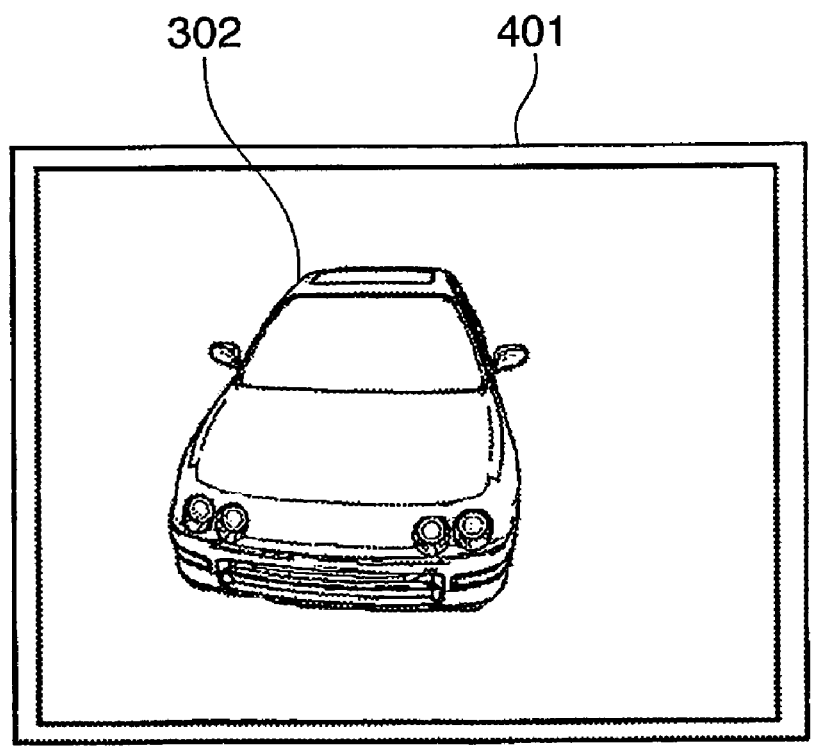
FIG. 4 is a view showing an example of a subjective image seen by the HMD wearer and displayed on a screen of a display.
Figure 5:
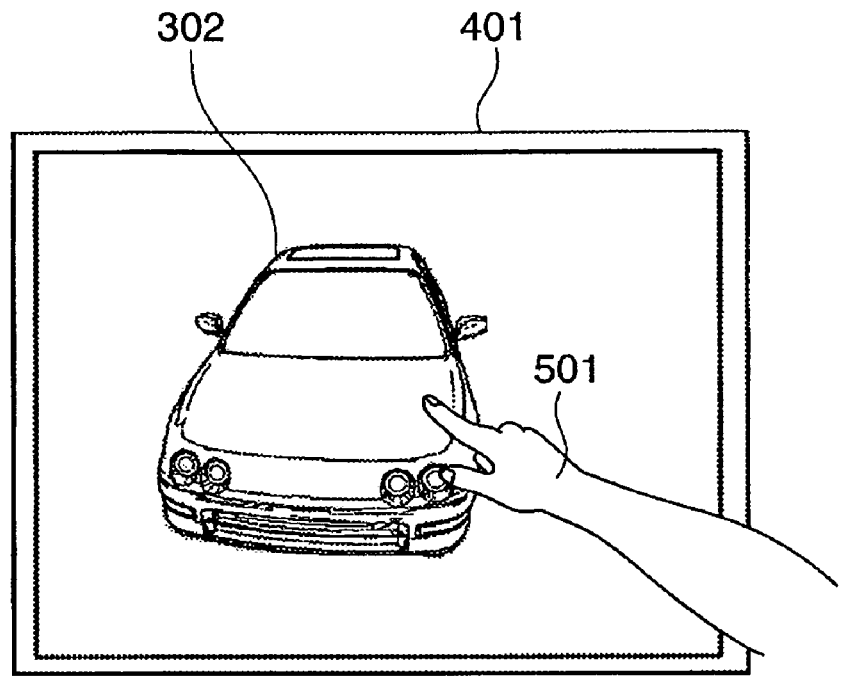
FIG. 5 is a view showing an example of an input operation by a non-HMD wearer.
Figure 6:
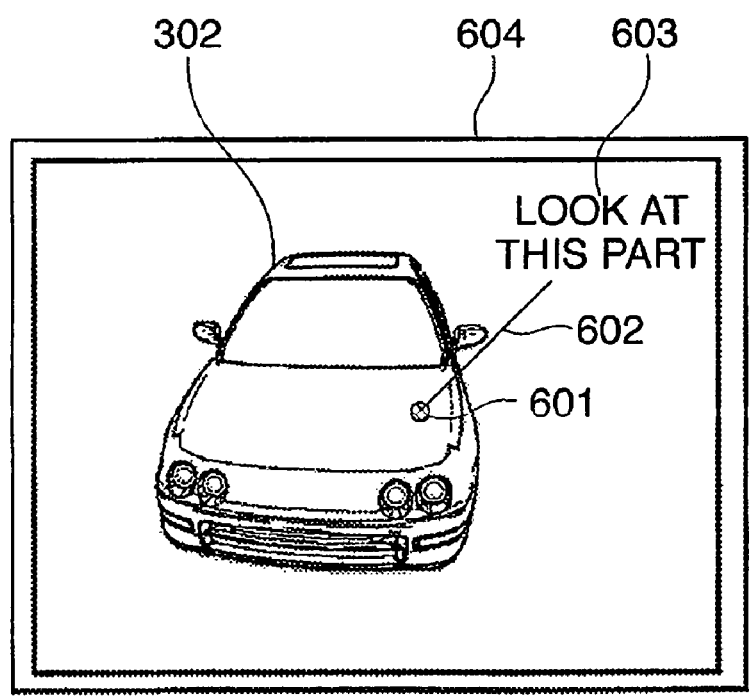
FIG. 6 is a view showing an example of an image displayed on an HMD.
Figure 7:
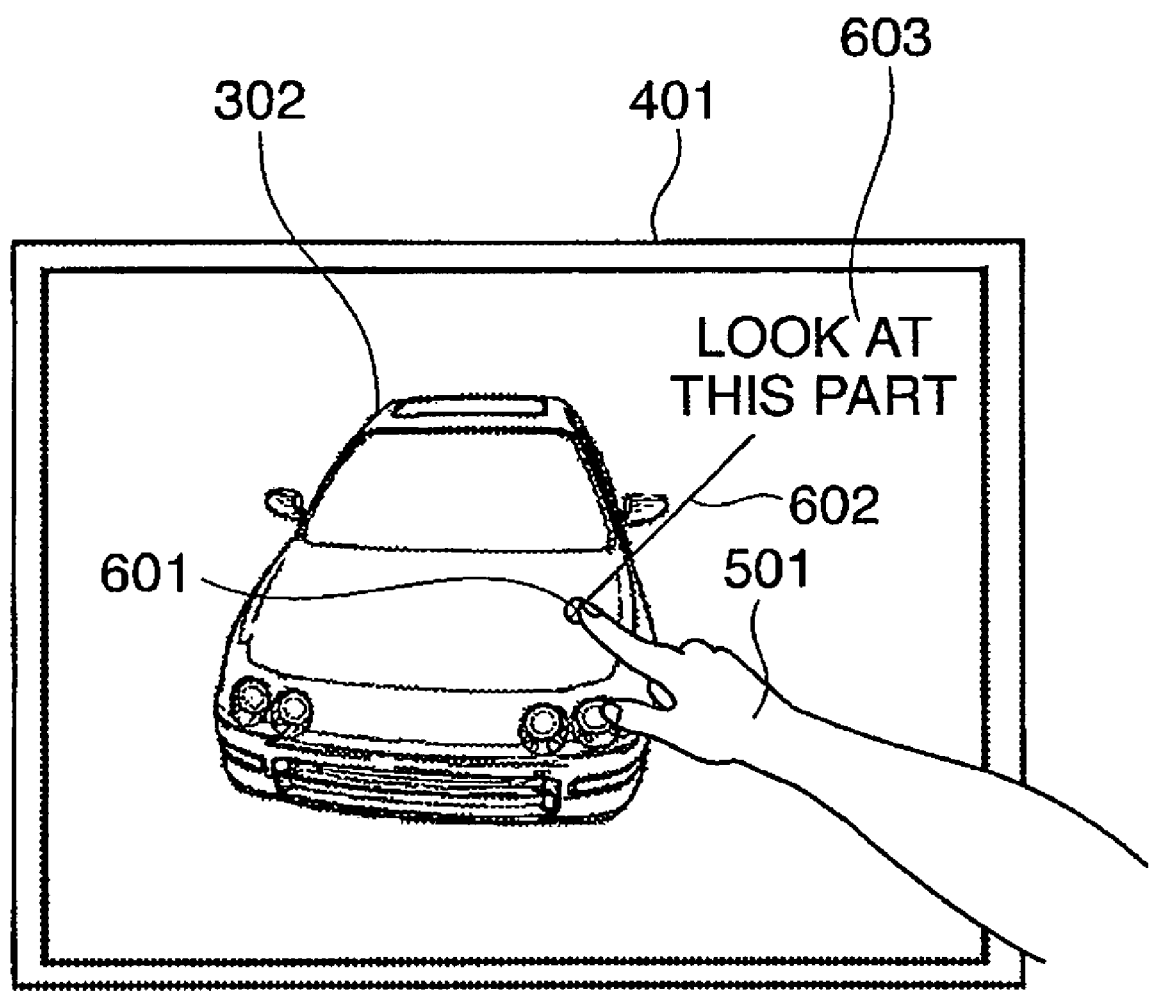
FIG. 7 is a view showing an example of an image displayed on the display.

Referring next to FIGS. 3 to 7, a description will be given of an example of screen view displayed in the image presentation system according to the present embodiment. FIG. 3 is a view showing a state in which an HMD wearer 301 is observing a virtual automobile 302. FIG. 4 is a view showing an example of a subjective image seen by the HMD wearer 301 and displayed on a screen 401 of the display 104. FIG. 5 is a view showing an example of an input operation by a non-HMD wearer. FIG. 6 is a view showing an example of an image displayed on the HMD 101. FIG. 7 is a view showing an example of an image displayed on the display 104.

A description will now be given of a case where the HMD wearer 301 who wears the HMD 101 observes the virtual automobile 302 as shown in FIG. 3. In this case, the same image as a subjective image presented to the HMD wearer 301 is displayed on the screen 401 of the display 104 as shown in FIG. 4. The non-HMD wearer can give instructions to the HMD wearer 301 while seeing the screen 401.

For example, when the non-HMD wearer seeing the screen 401 of the display 104 intends to check a desired part of the automobile 302, the non-HMD wearer directly touches a part to be checked of the automobile 302 displayed on the display 401 with his/her hand 501 as shown in FIG. 5. The position touched by the hand 501 of the non-HMD wearer is input as coordinate values to the three-dimensional CG drawing device 102 via the input device 105 (step S2 in FIG. 2). The three-dimensional CG drawing device 102 determines a position in the virtual world corresponding to the position indicated by the coordinate values based on the coordinate values acquired from the input device 105 as described above. The three-dimensional CG drawing device 102 then draws a CG image of, for example, the virtual world seen from the position of the HMD 101 as shown in FIG. 6 based on stored information on the virtual world and information on the position and orientation of the HMD 101 acquired from the HMD 101 (step S3 in FIG. 2). The drawn CG image includes the pointer object 601 at the determined position in the virtual world, a lead line 602 starting from the position of the pointer object 601, and an annotation character object 603 placed at an end of the lead line 602. The CG image including these objects is sent to the image synthesizing device 103.

The image synthesizing device 103 synthesizes the image picked up by the image pickup section of the HMD 101 and the CG image sent from the three-dimensional CG drawing device 102 (step S4 in FIG. 2) and sends the resultant synthesized image to the HMD 101 and the display 104.

An image appearing in FIG. 6 is displayed on the display sections of the HMD 101 (step S5 in FIG. 2). Referring to the displayed image, the HMD wearer 301 can recognize the position indicated by the non-HMD wearer. In the case where the right and left display sections of the HMD 101 display images with different parallaxes, the HMD wearer 301 can stereoscopically recognize the position of the pointer object 601 from a three-dimensional perspective. On the other hand, an image appearing in FIG. 7 is displayed on the display 104 (step S5 in FIG. 2). Referring to the displayed image, the non-HMD wearer can recognize that the pointer object 601 is displayed at the position indicated by his/her hand 501.

As described above, according to the present embodiment, the non-HMD wearer can see an image which is being observed by the HMD wearer 301 and also send an instruction to the HMD wearer 301 who is observing the image. The HMD wearer 301 can recognize the instruction given by the non-HMD wearer with reference to the image he/she is observing without the need to move his/her point of view.

Although in the present embodiment, one display 104 and one input device 105 are provided in the image presentation system, a plurality of displays and a plurality of input devices may be provided in the image presentation system. In the case where a plurality of displays and a plurality of input devices are provided in the image presentation system, the HMD wearer 301 can view an image obtained by synthesizing positions indicated using the respective input devices. It should be noted that each display may display only a position input from the corresponding input device or may display positions obtained by synthesizing positions input from the other input devices as well as the corresponding input device. Further, each display may selectively display either the input position or the obtained positions.

Figure 8:
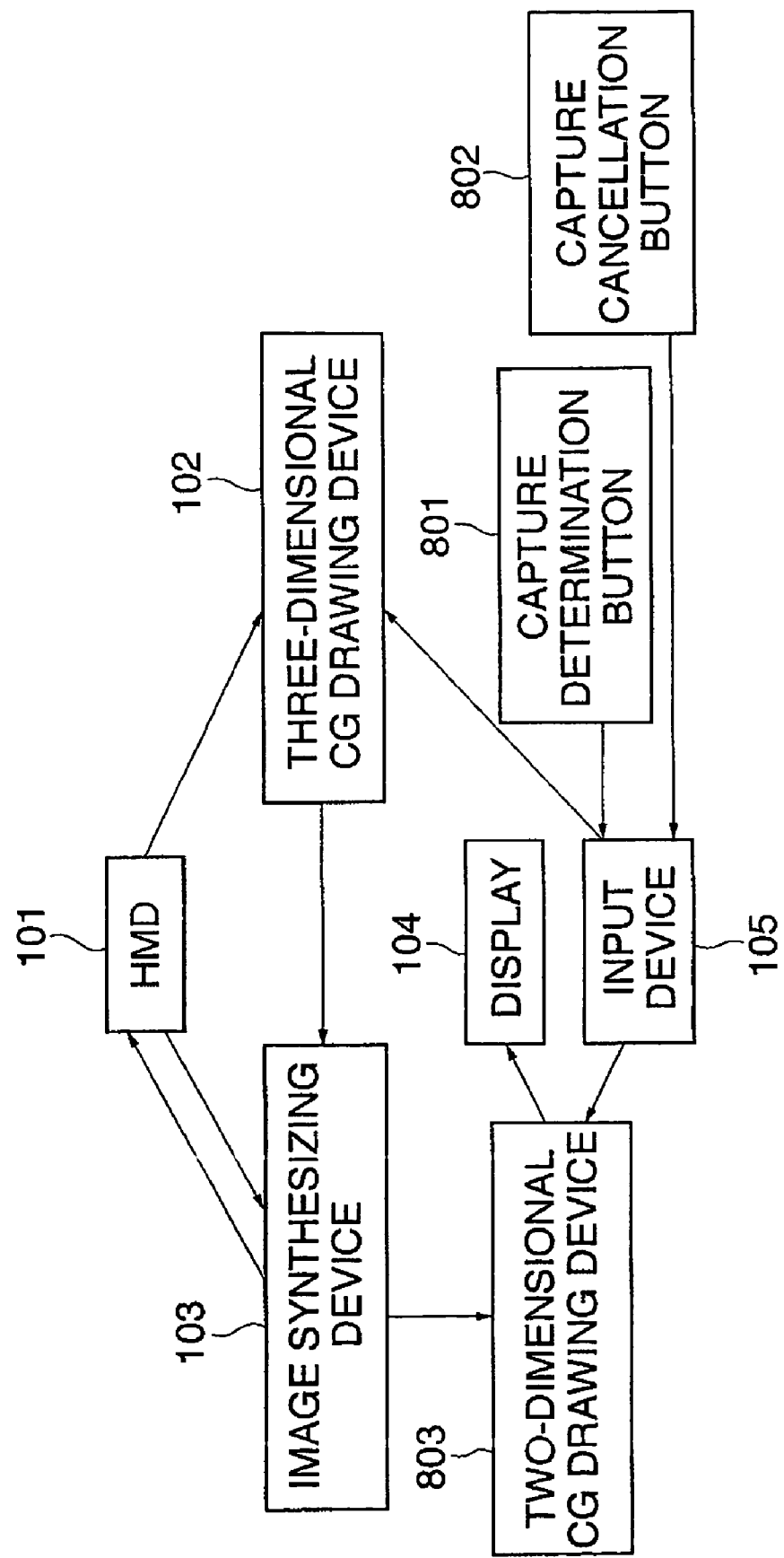
FIG. 8 is a block diagram showing the arrangement of an image presentation system according to a second embodiment of the present invention.
Figure 9A:
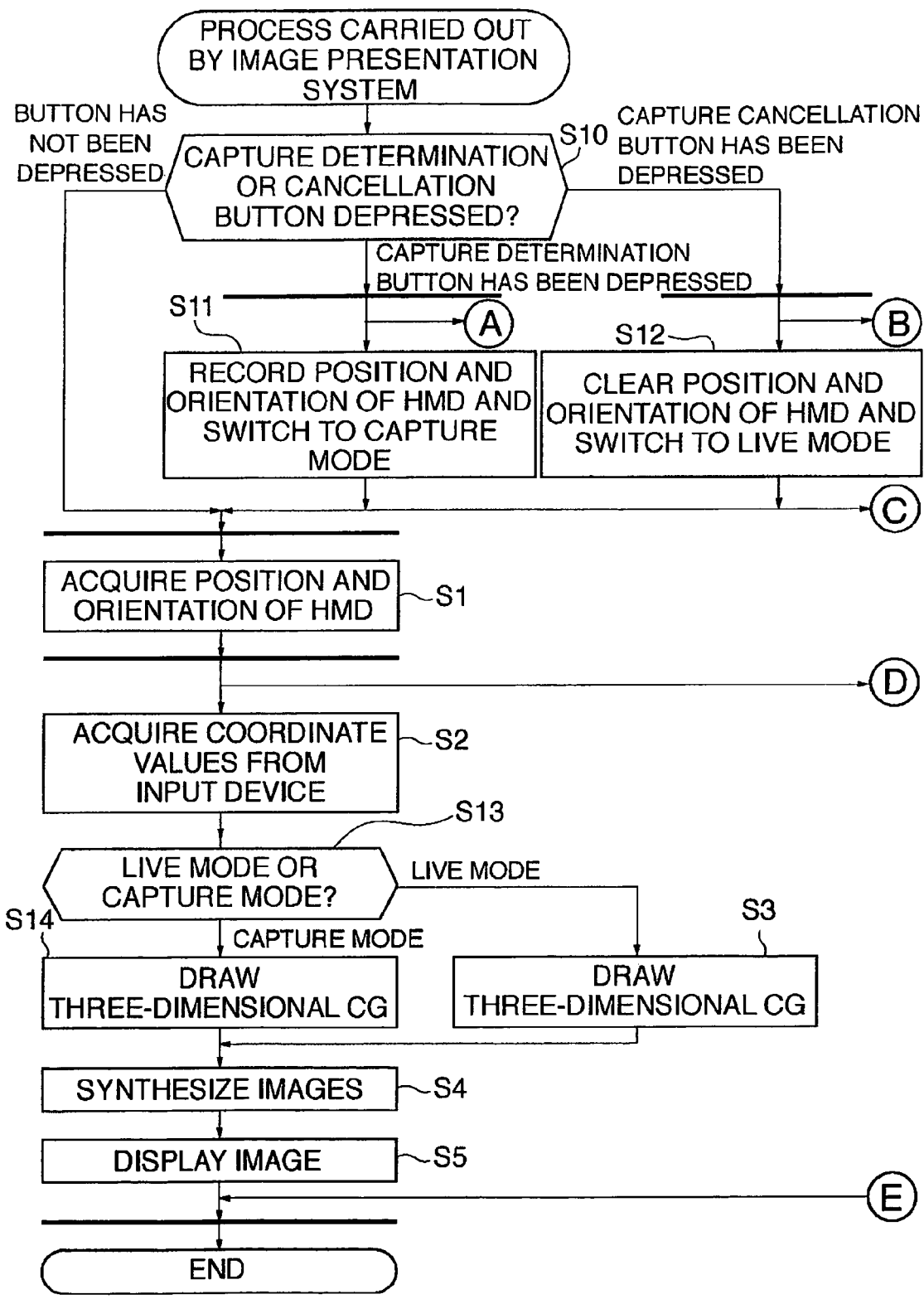
FIGS. 9A and 9B are flow charts showing the procedure of a process carried out by the image presentation system in FIG. 8.
Figure 9B:
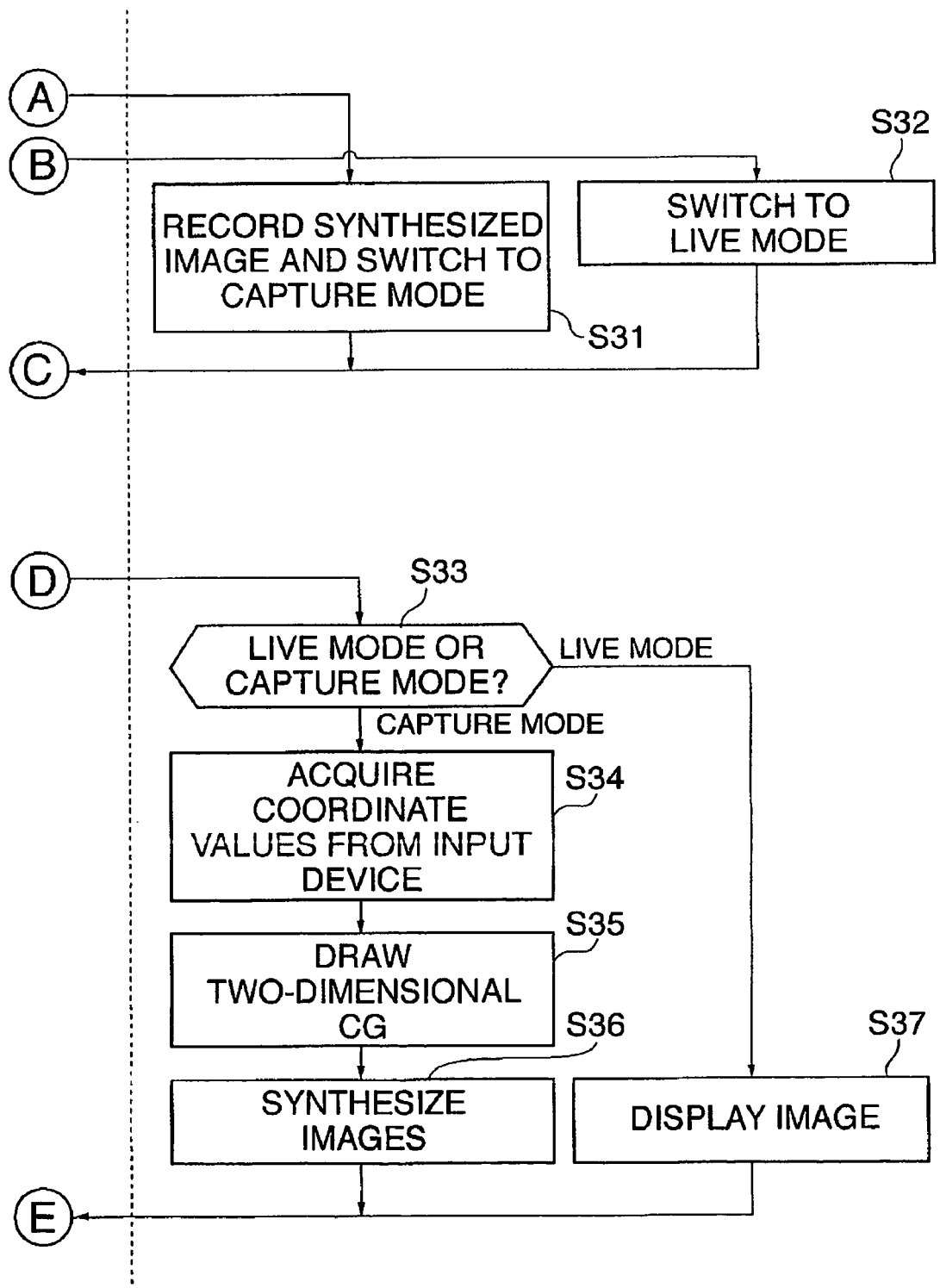
Figure 10:
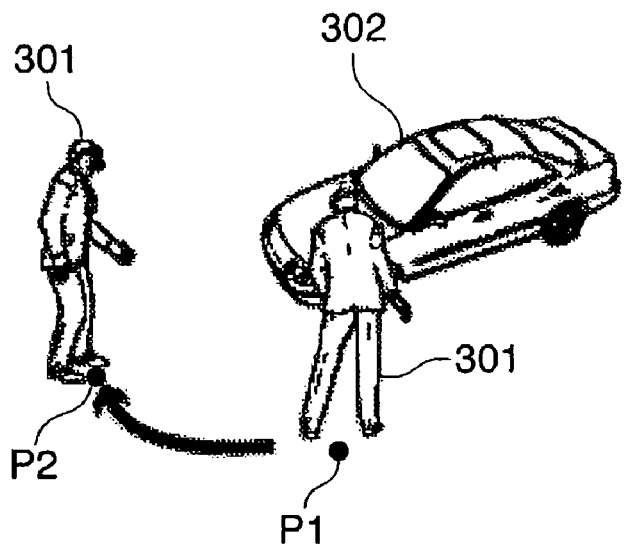
FIG. 10 is a view showing a state in which the HMD wearer has moved to change the position at which he observes the virtual automobile.
Figure 11:
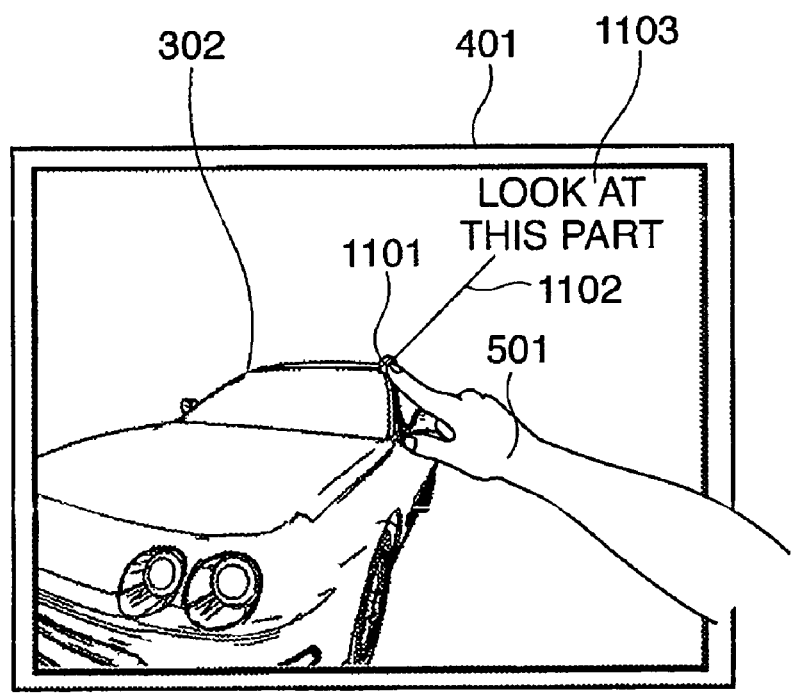
FIG. 11 is a view showing an example of an image displayed on the display.
Figure 12:
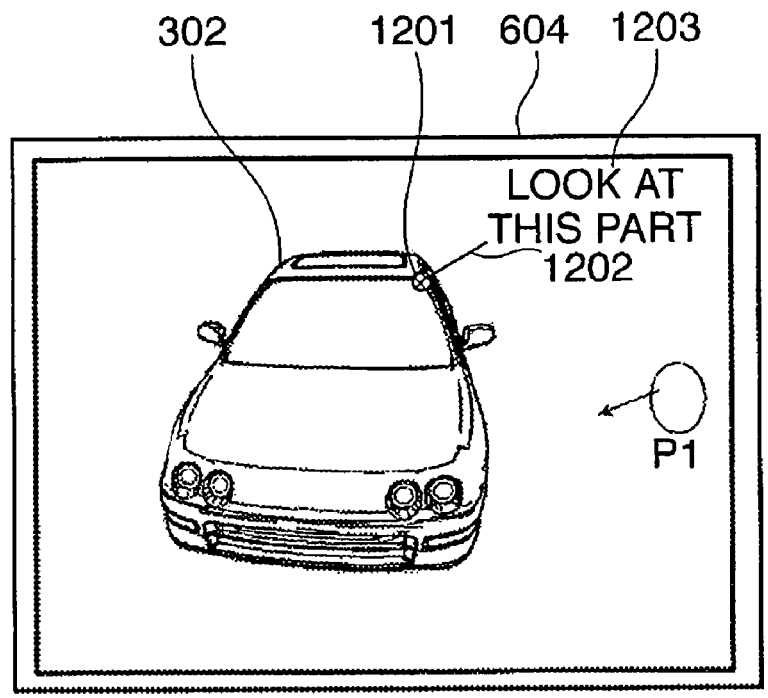
FIG. 12 is a view showing an example of an image displayed on the HMD.

Next, a description will be given of a second embodiment of the present invention with reference to FIGS. 8 to 12. FIG. 8 is a block diagram showing the arrangement of an image presentation system according to a second embodiment of the present invention. FIGS. 9A and 9B are flow charts showing the procedure of a process carried out by the image presentation system in FIG. 8. FIG. 10 is a view showing a state in which the HMD wearer 301 has moved to change the position at which he observes the virtual automobile 302. FIG. 11 is a view showing an example of an image displayed on the display 104. FIG. 12 is a view showing an example of an image displayed on the HMD 101.

The second embodiment differs from the above described first embodiment in that an image being observed by the HMD wearer is captured as a still image at a desired time point, and the captured still image is displayed on a screen which is being seen by the non-HMD wearer.

As shown in FIG. 8, in the present embodiment, a capture determination button 801, a capture cancellation button 802, and a two-dimensional CG drawing device 803 are provided in addition to the component elements of the image presentation system according to the first embodiment described above. The capture determination button 801 is implemented by a touch key displayed on the screen of the display 104. When the capture determination button 801 is depressed, a capture determination signal is sent to the input device 105. The capture determination button 801 may be implemented by a hard key. The capture cancellation button 802 is implemented by a touch key displayed on the screen of the display 104. When the capture cancellation button 802 is depressed, a capture cancellation signal is sent to the input device 105. The capture cancellation button 802 may be implemented by a hard key instead of the touch key.

The capture determination signal and the capture cancellation signal are sent to the three-dimensional CG drawing device 102 and the two-dimensional CG drawing device 803 via the input device 105.

The two-dimensional CG drawing device 803 is intended to draw a two-dimensional CG image in accordance with an input from the input device 105. Also, the two-dimensional CG drawing device 803 acquires a synthesized image from the image synthesizing device 103 and sends the synthesized image to the display 104. The two-dimensional CG drawing device 803 is implemented by a computer, for example.

Referring next to FIGS. 9A and 9B, a description will be given of a process carried out by the image presentation system according to the present embodiment. In the present embodiment, steps S10 to S14 and processing carried out by the two-dimensional CG drawing device 803 are added to the process in FIG. 2. Note that in FIGS. 9A and 9B, the same steps as those in FIG. 2 are denoted by identical reference numerals.

As shown in FIGS. 9A and 9B, in the present embodiment, the three-dimensional CG drawing device 102 determines in the step S10 whether or not the capture determination button 801 and the capture cancellation button 802 have been depressed. If neither of these buttons has been depressed, the three-dimensional CG drawing device 102 goes to the step S1. If the capture determination button 801 has been depressed, the three-dimensional CG drawing device 102 goes to the step S11, and on the other hand, if the capture cancellation button 802 has been depressed, the three-dimensional CG drawing device 102 goes to the step S12.

Also, if the capture determination button 801 has been depressed, the two-dimensional CG drawing device 803 goes to a step S31, and on the other hand, if the capture cancellation button 802 has been depressed, the two-dimensional CG drawing device 803 goes to a step S32.

If neither of the capture determination button 801 and the capture cancellation button 802 has been depressed, this means that an operation mode is a live mode, and therefore the three-dimensional CG drawing device 102 executes the steps S1, S2, and S3. Next, the image synthesizing device 103 executes the step S4 and then goes to the step S5. In the step S5, the image synthesizing device 103 sends the synthesized image generated in the step S4 to the HMD 101 and the two-dimensional CG drawing device 803. Upon receiving the synthesized image sent from the image synthesizing device 103, the two-dimensional CG drawing device 803 determines the operation mode in a step S33. If the operation mode is the live mode, the process proceeds to a step S37 wherein the two-dimensional CG drawing device 803 directly sends the synthesized image sent from the image synthesizing device 103 to the display 104, and the synthesized image is displayed on the display 104. Thus, when the operation mode is the live mode, the same processing as in the first embodiment described above is carried out.

If the capture determination button 801 has been depressed, the process proceeds to the step S11 and the step S31. In the step S11, the three-dimensional CG drawing device 102 records the position and orientation of the HMD 101 based on the information on the position and orientation of the HMD 101 at the time point when the capture determination button 801 was depressed and switch the operation mode to a capture mode. In the step S31, the two-dimensional CG drawing device 803 records the synthesized image sent from the image synthesizing device 103 as a still image at the time point when the capture determination button 801 was depressed. Also, the two-dimensional CG drawing device 803 switches the operation mode to the capture mode.

Next, in the step S1, the three-dimensional CG drawing device 102 acquires information on the position and orientation of the HMD 101. In the next step S2, the three-dimensional CG drawing device 102 acquires the coordinate values of the position on the screen of the display 104 which was touched by the hand of the non-HMD wearer via the input device 105. The three-dimensional CG drawing device 102 then determines the operation mode in the step S13. Since it is determined here that the operation mode is the capture mode, the three-dimensional CG drawing device 102 draws three-dimensional CG images in the step S14. On this occasion, the three-dimensional CG drawing device 102 draws a CG image of the virtual world, and a CG image indicative of the position and orientation of the HMD 101 recorded in the step S11. A pointer object, a lead line, an annotation character object, and so forth are drawn based on the position and orientation of the HMD 101 recorded in the step S11 and the coordinate values acquired in the step S2. The drawn CG images are sent to the image synthesizing device 103.

Next, in the step S4, the image synthesizing device 103 acquires an image picked up by the image pickup section of the HMD 101 from the HMD 101 and synthesizes this acquired image and the CG images sent from the three-dimensional CG drawing device 102. The resultant synthesized image is sent to the HMD 101 and the two-dimensional CG drawing device 803 in the step S5. As a result, the synthesized image is displayed on the HMD 101.

Also, upon receiving the synthesized image, the two-dimensional CG drawing device 803 determines the operation mode in the step S33. Since it is determined here that the operation mode is the capture mode, the process proceeds to a step S34 wherein the two-dimensional CG drawing device 803 acquires the coordinate values obtained by the non-HMD wearer's input operation via the input device 105.

Next, in a step S35, the two-dimensional CG drawing device 803 then draws two-dimensional CG images which represent a pointer object, a lead line, and an annotation character object based on the acquired coordinate values. Next, in a step S36, the two-dimensional CG drawing device 803 synthesizes the still image recorded in the step S31 and the two-dimensional CG image drawn in the step S35 and sends the resultant synthesized image to the display 104. As a result, the synthesized image created by synthesizing the captured still image and the two-dimensional CG images is displayed on the display 104.

If the capture cancellation button 802 has been depressed, the process proceeds to the step S12 wherein the three-dimensional CG drawing device 102 clears the recorded position and orientation of the HMD 101 and switches the operation mode to the live mode. The two-dimensional CG drawing device 803 switches the operation mode to the live mode in the step S32.

Thereafter, as described above, the three-dimensional CG drawing device 102 executes the steps S1, S2, and S3, and the image synthesizing device 103 executes the steps S4 and S5. The two-dimensional CG drawing device 803 executes the step S37.

Referring next to FIGS. 10 to 12, a description will be given of an example of screen view in the image presentation system according to the present embodiment.

In this example, as shown in FIG. 10, it is assumed that at a time point when the HMD wearer 301 standing at a point P1 observes the virtual automobile 302, the non-HMD wearer who is seeing the display 104 depresses the capture determination button 801, and thereafter, the HMD wearer 301 moves to a point P2.

Specifically, if the capture determination button 801 is depressed when the HMD wearer 301 standing at the point P1 is observing the virtual automobile 302, a still image in FIG. 11 is displayed on the screen 401 of the display 104. This still image is a still image of the screen seen by the HMD wearer 301 at the point P1. When the non-HMD wearer touches a position on the screen 401 of the display 104 with his/her hand 501, a pointer object 1101 is drawn at the position indicated by the hand 501 of the non-HMD wearer. Also, a lead line 1102 starting from the pointer object 1101 is drawn, and an annotation character object 1103 is drawn at an end of the lead line 1102.

When the HMD wearer 301 moves from the point P1 to the point P2, a screen 604 in FIG. 12 is displayed on the display sections of the HMD 101. In this example, a pointer object 1201, a lead line 1202, and an annotation character object 1203 are drawn in addition to the virtual automobile 302. The position of the pointer object 1201 is calculated based on the position indicated by the non-HMD wearer and the position and orientation of the HMD 101 recorded in advance. For this reason, the pointer object 1101 in FIG. 11 and the pointer object 1201 in FIG. 12 indicate the same position of the virtual automobile 302.

Also, a CG image P1 indicative of the position and orientation of the HMD 101 at the time point when the capture determination button 801 was depressed is drawn on the screen 604 in FIG. 12. Referring to this CG image P1, the HMD wearer can recognize the point of view from which the non-HMD wearer seeing the display 104 is seeing the virtual automobile 302.

As described above, according to the present embodiment, since the non-HMD wearer seeing the display 104 can give an instruction to the HMD wearer 301 while seeing a still image, the non-HMD wearer is never annoyed with sway of the screen caused by swinging of the HMD 101 that follows the movement of the HMD wearer 301. Also, the HMD wearer 301 can freely move without concern for sway of the HMD 101 and receives an instruction from the non-HMD wearer seeing the display 104 while the HMD wearer 301 moves.

Figure 13:
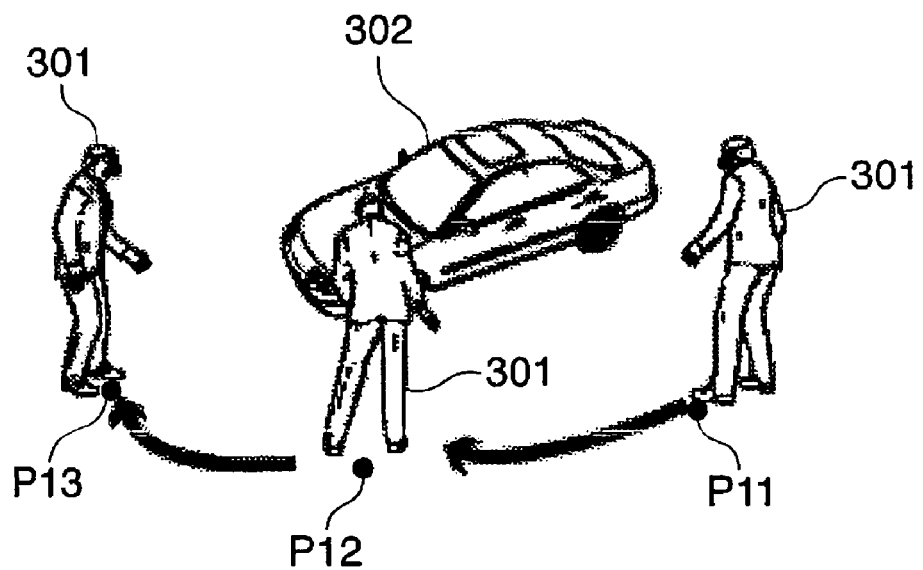
FIG. 13 is a view showing a state in which in an image presentation system according to a third embodiment of the present invention, the HMD wearer has moved to change the position at which he observes the virtual automobile.
Figure 14:
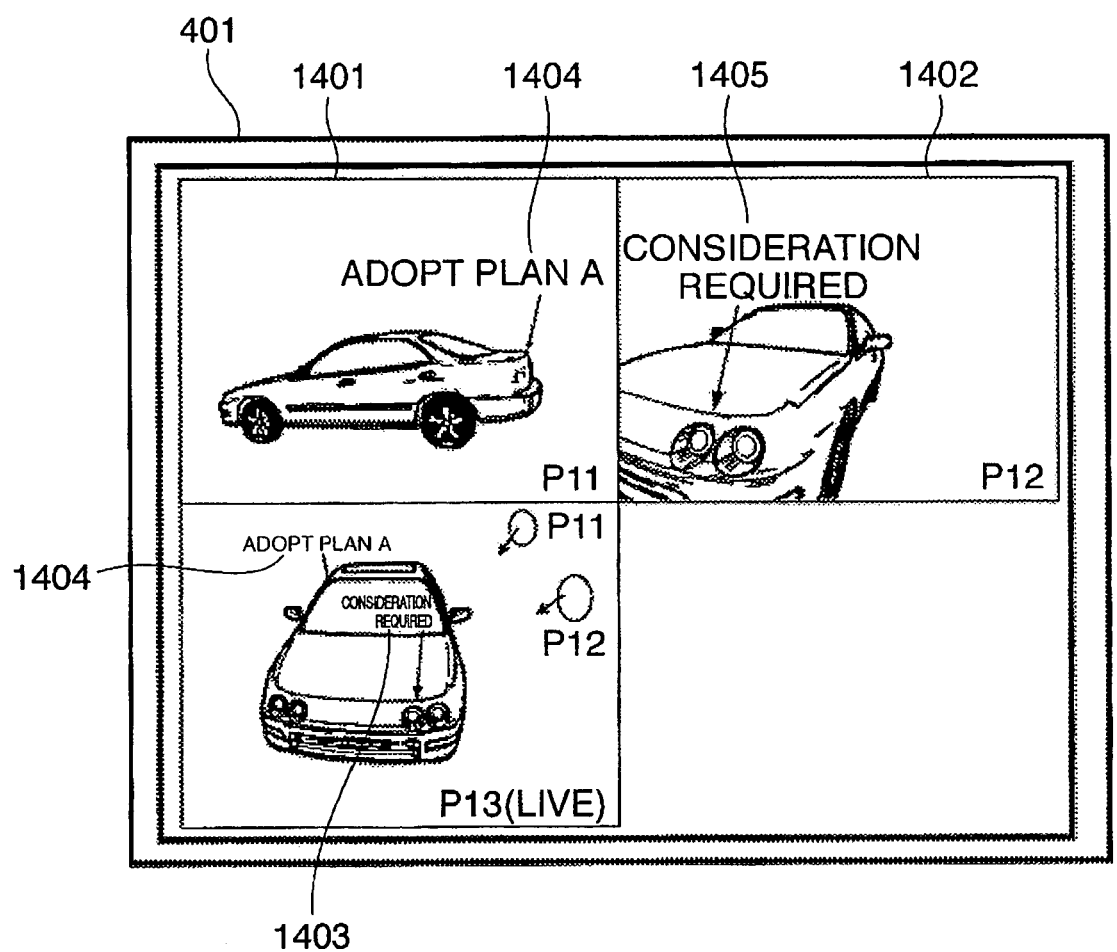
FIG. 14 is a view showing an example of an image displayed on a display in the image presentation system in FIG. 13.

Next, a description will be given of a third embodiment of the present invention with reference to FIGS. 13 and 14. FIG. 13 is a view showing a state in which in an image presentation system according to a third embodiment of the present invention, the HMD wearer 301 has moved to change the position at which he observes the virtual automobile 302. FIG. 14 is a view showing an example of an image displayed on a display in the image presentation system in FIG. 13.

In the present embodiment, as compared with the second embodiment described above, the three-dimensional CG drawing device 102 is additionally provided with a function of recording the positions and orientations of the HMD 101 at different times points, the two-dimensional CG drawing device 803 is additionally provided with a function of displaying split screen views, and the system is additionally provided with a function of freely designating an annotation character object.

In the following description, it is assumed that as shown in FIG. 13, when the HMD wearer 301 moves to a point P11, a point P12, and a point P13 in this order, the capture determination button 801 is depressed at each of the points P11 and P12, and then the HMD wearer 301 moves to the point P13.

In this case, as shown in FIG. 14, still images 1401 and 1402 captured at the points P11 and P12, respectively, and an image which is being seen by the HMD wearer 301, i.e. a moving image 1403 are displayed as split views on the screen 401 of the display 104. The non-HMD wearer can give an instruction regarding each of the split views 1401, 1402, and 1403 and also freely change annotation character objects to be displayed in accordance with purposes, like annotation character objects 1404 and 1405. The annotation character objects may be selected using the input device 105 from among character objects prepared in advance or may be input using the input device 105 on an as-needed basis.

Figure 15:
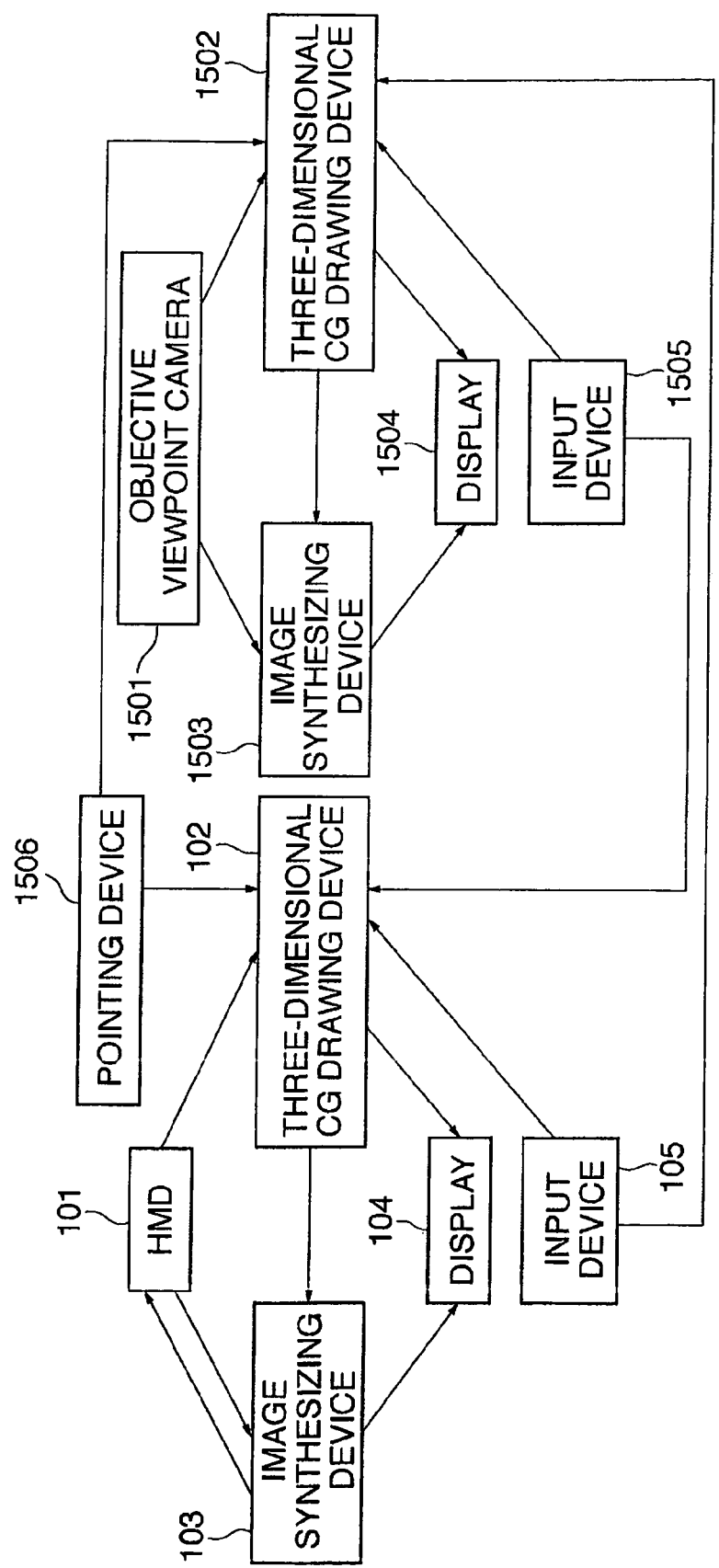
FIG. 15 is a block diagram showing the arrangement of an image presentation system according to a fourth embodiment of the present invention.
Figure 16:
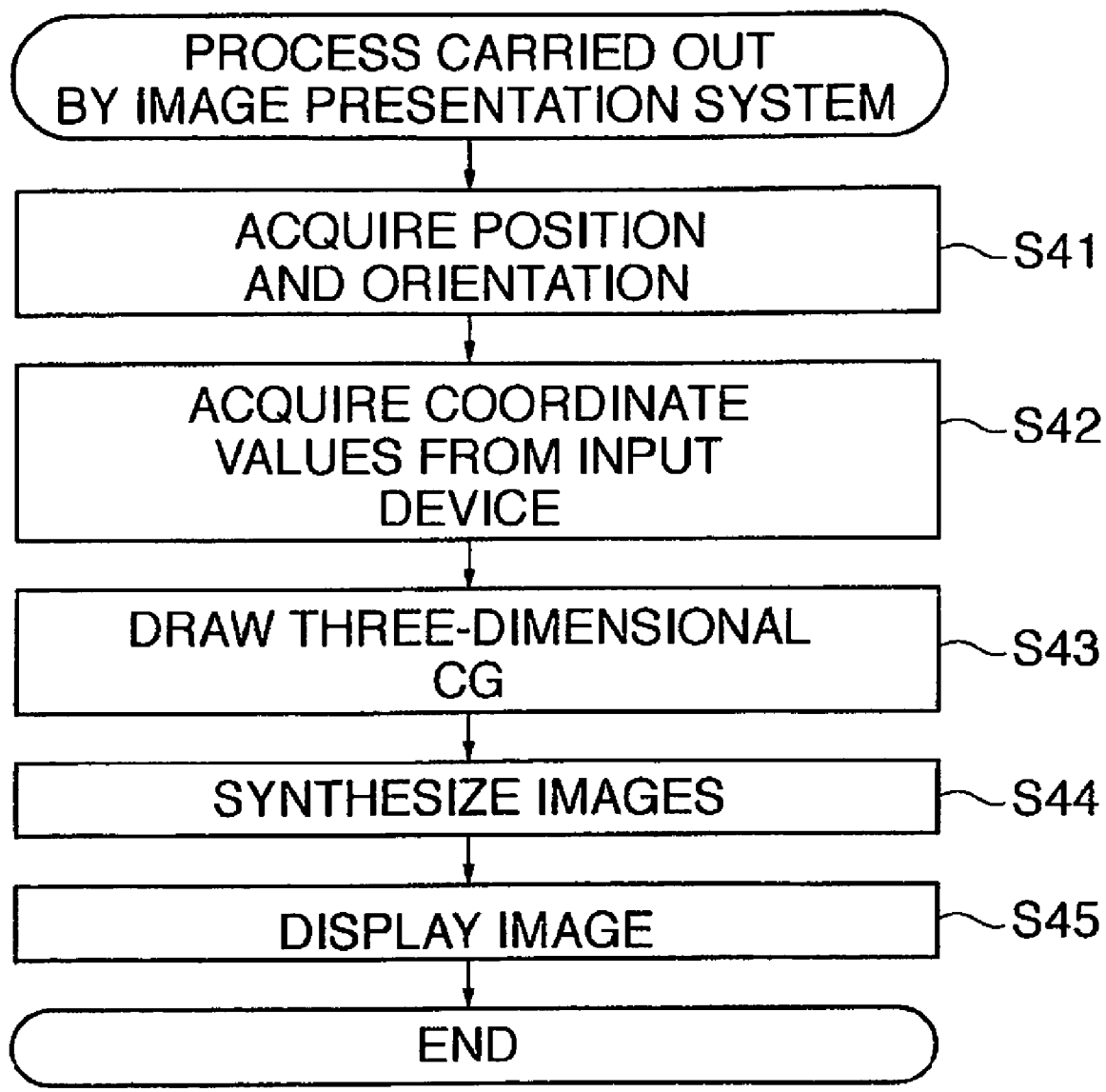
FIG. 16 is a flow chart showing the procedure of a process carried out by the image presentation system in FIG. 15.
Figure 17:
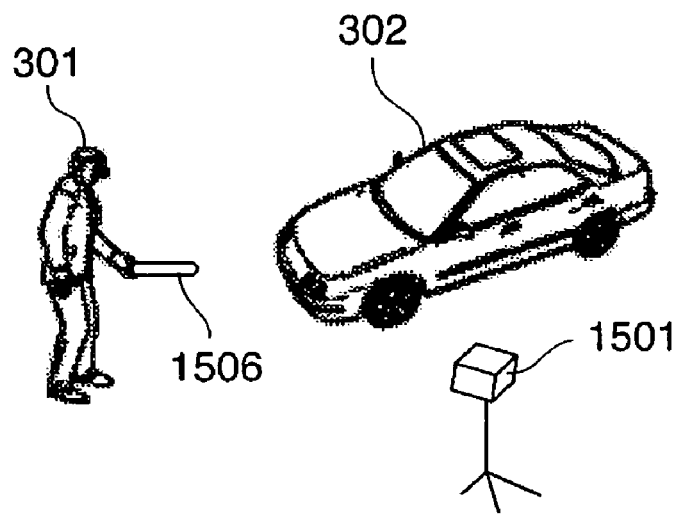
FIG. 17 is a view showing a state in which in the image presentation system in FIG. 15, an objective viewpoint camera and the HMD wearer are observing the virtual automobile.
Figure 18:
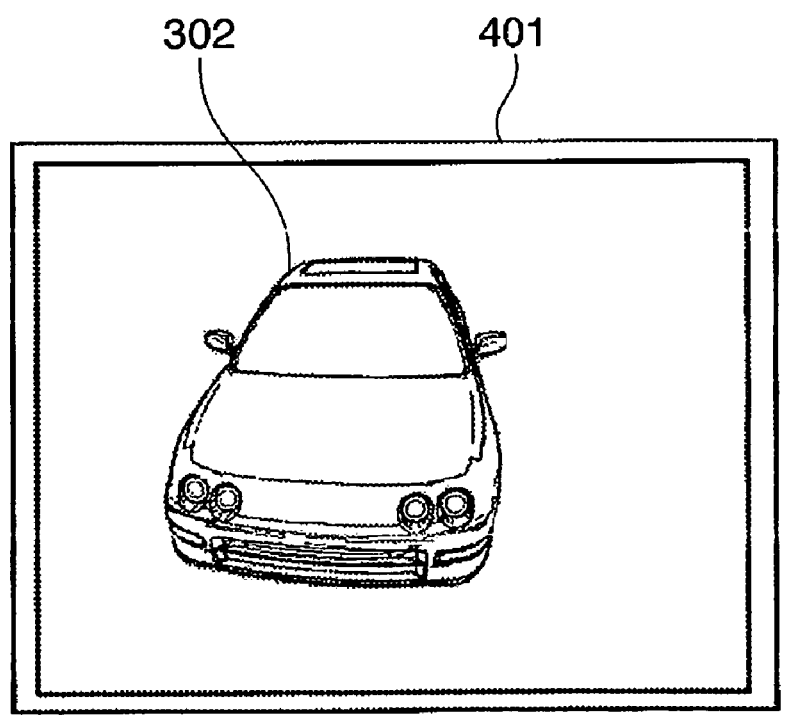
FIG. 18 is a view showing an example of an image displayed on the screen of the display before an input operation.
Figure 19:
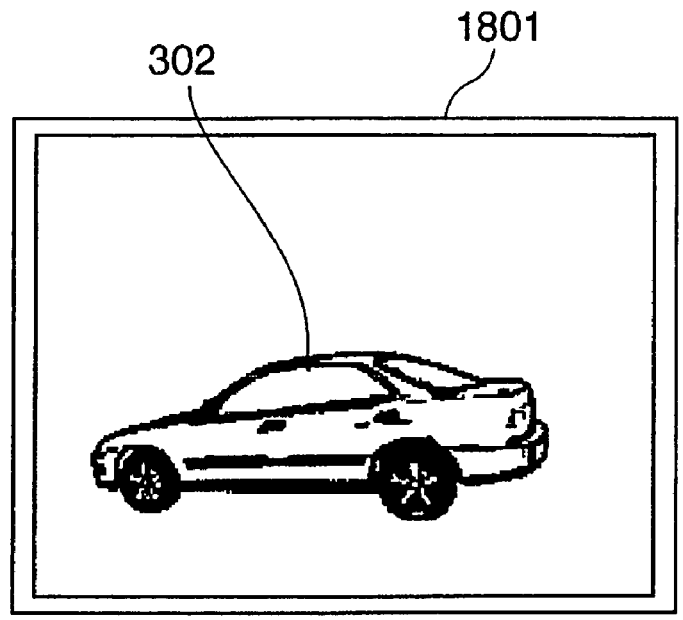
FIG. 19 is a view showing an example of an image displayed on a screen of a display before an input operation.
Figure 20:
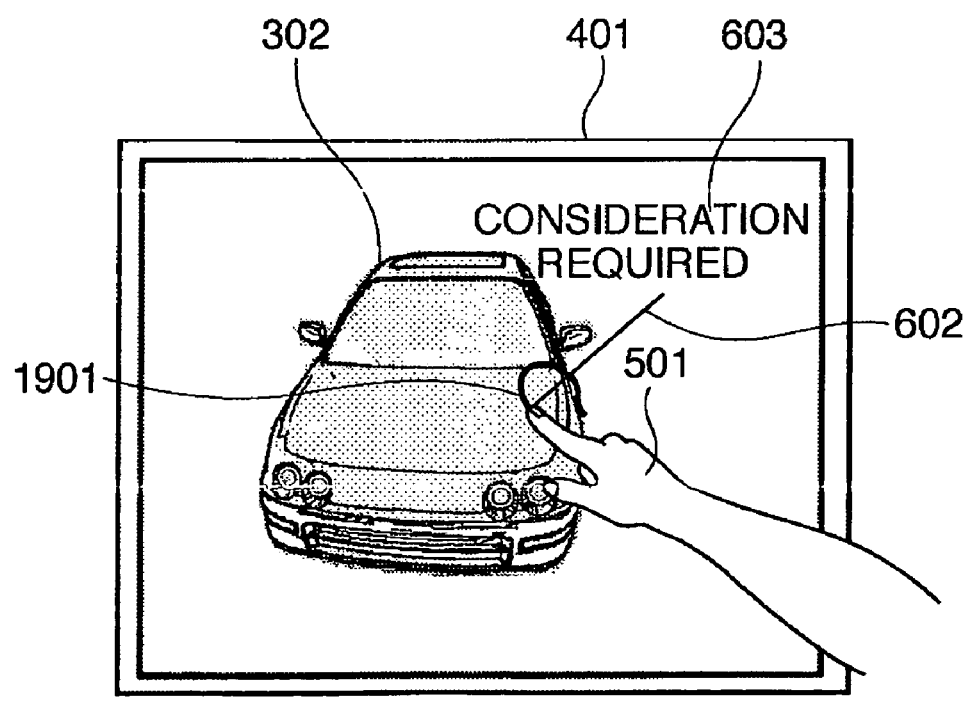
FIG. 20 is a view showing an example of an input operation by a non-HMD wearer.
Figure 21:
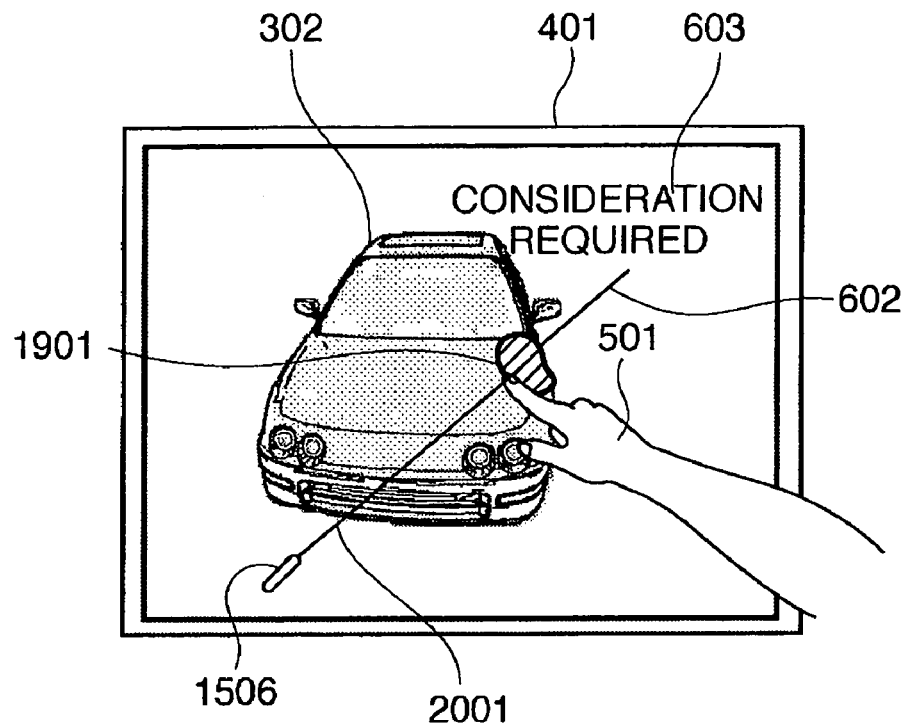
FIG. 21 is a view showing an example of an image displayed on the screen of the display after an input operation.
Figure 22:
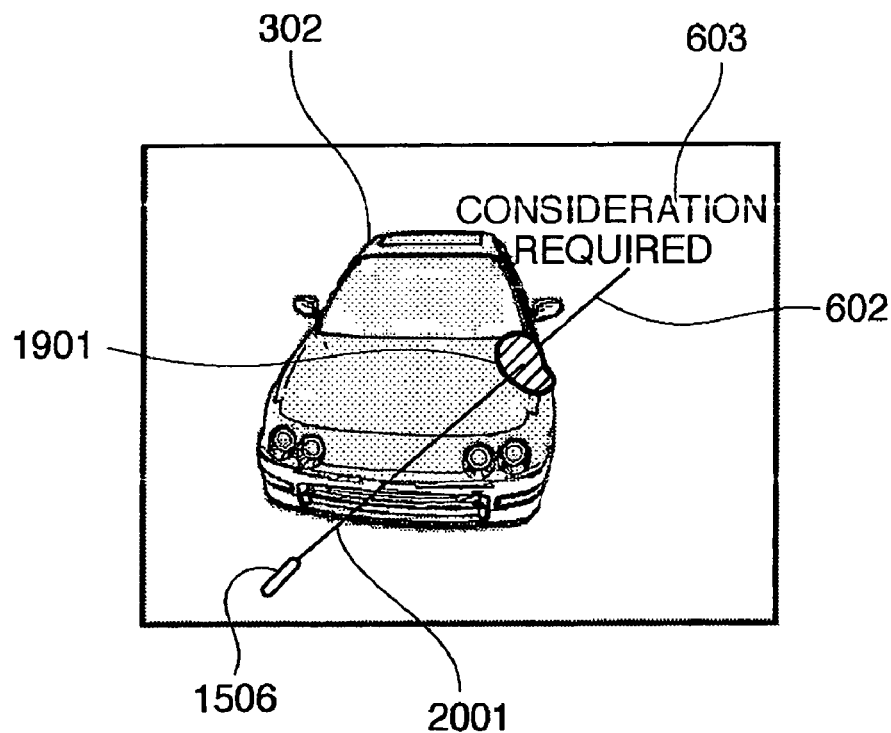
FIG. 22 is a view showing an example of a subjective image seen by the HMD wearer after an input operation.
Figure 23:
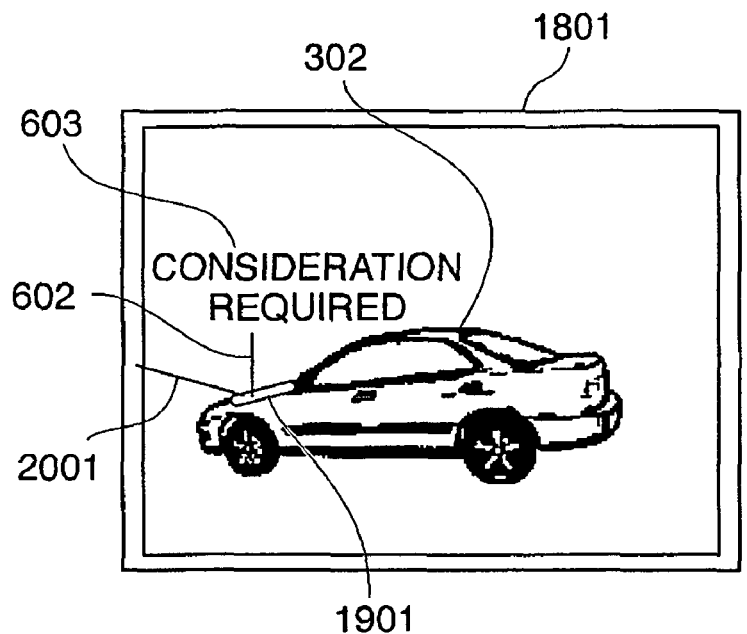
FIG. 23 is a view showing an example of an image displayed on the screen of the display after an input operation.

Referring next to FIGS. 15 to 23, a description will be given of a fourth embodiment of the present invention. FIG. 15 is a block diagram showing the arrangement of an image presentation system according to the fourth embodiment of the present invention. FIG. 16 is a flow chart showing the procedure of a process carried out by the image presentation system in FIG. 15. FIG. 17 is a view showing a state in which in the image presentation system in FIG. 15, an objective viewpoint camera 1501 and the HMD wearer 301 are observing the virtual automobile 302. FIG. 18 is a view showing an example of an image displayed on the screen 401 of the display 104 before an input operation. FIG. 19 is a view showing an example of an image displayed on a screen 1801 of a display 1504 before an input operation. FIG. 20 is a view showing an example of an input operation by the non-HMD wearer. FIG. 21 is a view showing an example of an image displayed on the screen 401 of the display 104 after an input operation. FIG. 22 is a view showing an example of a subjective image seen by the HMD wearer after an input operation. FIG. 23 is a view showing an example of an image displayed on the screen 1801 of the display 1504 after an input operation.

In the fourth embodiment, as distinct from the first embodiment described above, the objective viewpoint camera 1501 is provided in addition to the HMD 101, so that the non-HMD wearer can give instructions regarding an image picked up by the objective viewpoint camera 1501 as well as a subjective image seen by the HMD wearer 301. Also, the image presentation system is additionally provided with a function of displaying not only the pointer object 601, the lead line 602, and the annotation character object 603 but also other instruction objects such as a line segment extending to the pointer object 601 and a region object indicative of a designated region.

In the fourth embodiment, as shown in FIG. 15, as compared with the arrangement in FIG. 1, the image presentation system is additionally provided with the objective viewpoint camera 1501, a three-dimensional CG drawing device 1502, an image synthesizing device 1503, the display 1504, an input device 1505, and a pointing device 1506. In the present embodiment, the displays 104 and 1504 should not necessarily be prepared for the respective image synthesizing devices 103 and 1503, but a display which selectively displays images input from the plurality of image synthesizing devices 103 and 1503 may be used. Also, images input from the plurality of image synthesizing devices 103 and 1503 should not only selectively displayed, but also simultaneously displayed using a split screen. The objective viewpoint camera 1501 is a device to which an image pickup section and a sensor section, not shown, are attached, and may be either a fixed type or a movable type. A detailed description of the objective viewpoint camera 1501 will be omitted, since the objective viewpoint camera 1501 is a camera which is necessary for realizing the MR system and related technologies are known. Information input to the input device 105 is sent to the three-dimensional CG drawing device 1502 as well as the three-dimensional CG drawing device 102 at the same time. Similarly, information input to the input device 1505 is sent to the three-dimensional CG drawing device 102 as well as the three-dimensional CG drawing device 1502 at the same time. The pointing device 1506 is a device to which a sensor section, not shown, is attached. Information on the position and orientation of the pointing device 1506 detected by the sensor section thereof is sent to the three-dimensional CG drawing devices 102 and 1502.

Referring next to a flow chart of FIG. 16, a description will be given of the procedure of a process carried out by the image presentation system in FIG. 15.

The flow chart of FIG. 16 includes procedures carried out in accordance with programs stored in the respective ones of the three-dimensional CG drawing device 1502 and the image synthesizing device 1503.

First, in the image presentation system according to the present embodiment, the three-dimensional CG drawing device 102 acquires information on the positions and orientations of the HMD 101 and the pointing device 1506 in a step S41. Similarly, the three-dimensional CG drawing device 1502 acquires information on the positions and orientations of the objective viewpoint camera 1501 and the pointing device 1506.

Next, in a step S42, the three-dimensional CG drawing devices 102 and 1502 receive input information corresponding to an input operation by the non-HMD wearer via the input device 105. In the present embodiment, the input device 105 is implemented by a touch panel attached to the screen of the display 104, and hence this input operation involves touching a desired position on the screen of the display 104 by the hand of the non-HMD wearer (FIG. 20).

Next, in a step S43, the three-dimensional CG drawing device 102 draws a CG image of the virtual world seen from the position of the HMD 101 based on information on the virtual world which is stored in the. three-dimensional CG drawing device 102 and the information on the position and orientation of the HMD 101 acquired from the HMD 101 and sends the CG image to the image synthesizing device 103. Similarly, the three-dimensional CG drawing device 1502 draws a CG image of the virtual world seen from the position of the objective viewpoint camera 1501 based on information on the virtual world which is stored in the three-dimensional CG drawing device 1502 and the information on the position and orientation of the objective viewpoint camera 1501 acquired from the objective viewpoint camera 1501 and sends the CG image to the image synthesizing device 1503. The drawn CG image includes a pointer object at a calculated position in the virtual world, the lead line 602 starting from the position of the pointer object, and the annotation character object 603 at the end of the lead line 602. The three-dimensional CG drawing devices 102 and 1502 obtain three-dimensional position and shape in the virtual world which correspond to the position indicated by those coordinate values on the display which are acquired from the input device 105. On this occasion, an example of the method to obtain the position and shape represented by given coordinate values will now be described. First, a three-dimensional position in the virtual world is obtained from coordinate values acquired from the input device 105. At this time, a virtual ray of light extending from a point of view toward the position and shape represented by the given coordinate values is set, and a point in which the virtual ray of light intersects an object existing in the virtual world for the first time is regarded as a three-dimensional position. Such three-dimensional positions are recorded, and a locus connecting the three-dimensional positions is recorded as a three-dimensional shape. With respect to the shape thus obtained, texture mapping is performed on a concerned area of the virtual model of the automobile 302. It should be noted that instruction objects should not necessarily be displayed by performing texture mapping on the virtual automobile 302, but may be displayed by generating a new three-dimensional object in accordance with shape. The pattern, color, etc. of texture used on this occasion may be freely changed in accordance with purposes. The CG images generated by texture mapping are sent to the respective image synthesizing devices 103 and 1503. The three-dimensional CG drawing devices 102 and 1502 draw respective line segment images each starting from the position of the pointing device 1506 acquired in the step S41 and ending at a part of the coordinate values acquired from the input device 105 and send the resultant CG images to the respective image synthesizing devices 103 and 1503. Part of coordinate values may be, for example, an input starting point, an input end point, or the center of gravity of an input area and may be changed in accordance with purposes.

Next, in a step S44, the image synthesizing device 103 acquires an image picked up by the image pickup section of the HMD 101 from the HMD 101 and synthesizes this acquired image and the CG image sent from the three-dimensional CG drawing device 102. The resultant synthesized image is sent to the display 104. Similarly, the image synthesizing device 1503 acquires an image picked up by the image pickup section of the objective viewpoint camera 1501 from the objective viewpoint camera 1501 and synthesizes this acquired image and the CG image sent from the three-dimensional CG drawing device 1502. The resultant synthesized image is sent to the display 1504.

Next, in a step S45, the displays 104 and 1504 display the respective synthesized images. As a result, the HMD wearer can recognize the position indicated by the non-HMD wearer, and both the HMD wearer and the non-HMD wearer can recognize the instruction information (i.e. the lead line 602, the annotation character object 603, a locus object 1901, and a line segment object 2001 extending to the pointer object).

Although in the above description, an input operation is carried out using the input device 105, an input operation may be carried out using the input device 1505. In this case as well, input information is sent to both of the three-dimensional CG devices 102 and 1502. The subsequent processing is the same as the above described processing.

Although in the fourth embodiment described above, the input device 105 is implemented by the touch panel attached to the screen of the display 104, the present invention is not limited to this, but the input device 105 may be implemented by a mouse, a laser pointer, or the like. For example, if the input device 105 is a laser pointer, a device that detects light may be provided on a surface of the display 104, so that the position (coordinate values) on the display 104 onto which laser light is projected can be input. Alternatively, a plurality of laser pointers that emit light of different colors may be used to enable simultaneous pointing by a plurality of persons. For example, a device provided on the display 104, for detecting light may recognize differences in colors of laser light, and line segment objects 2001 extending to pointer objects may be drawn in colors similar to the colors of the laser light.

Although in the fourth embodiment described above, in step S43, the pointer object, the lead line 602 starting from the position of the pointer object, the annotation character object 603 at the end of the lead line 602, the CG images generated by texture mapping, and the line segment object 2001 (hereinafter the pointer object, the lead line 602, and the annotation character object 603 will be collectively referred to as the instruction objects) are all displayed as instruction objects on the displays 104 and 1504, the present invention is not limited to this, but only necessary ones of the instruction objects may be selectively displayed on the displays 104 and 1504.

In a seventh embodiment, the line segment object 2001 is extended from the focal position of the objective viewpoint camera 1501.

Figure 24:
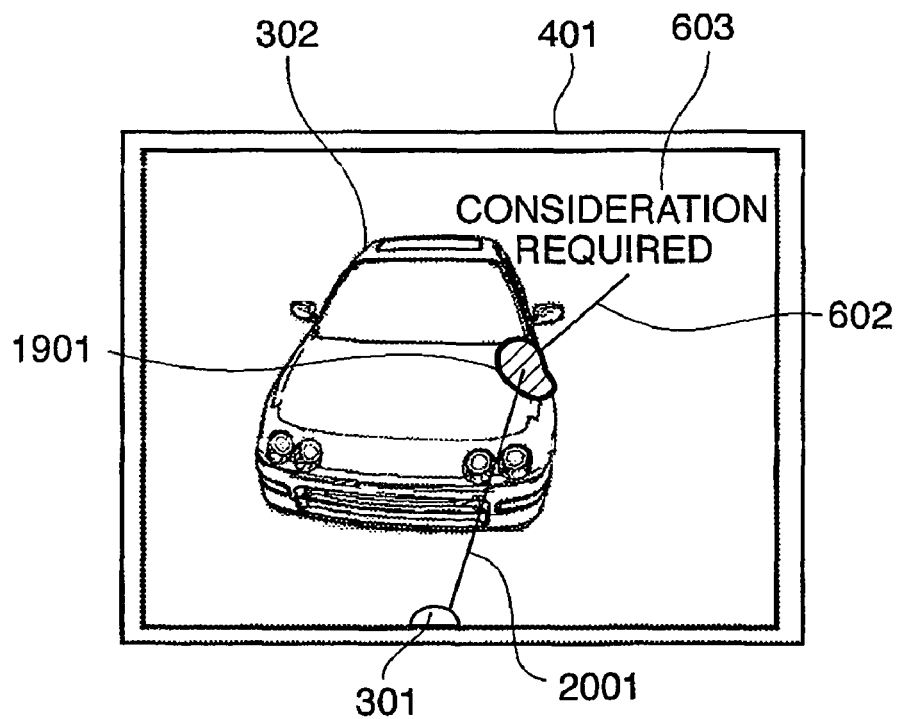
FIG. 24 is a view showing an example of an image displayed on the screen of the display after an input operation.
Figure 25:
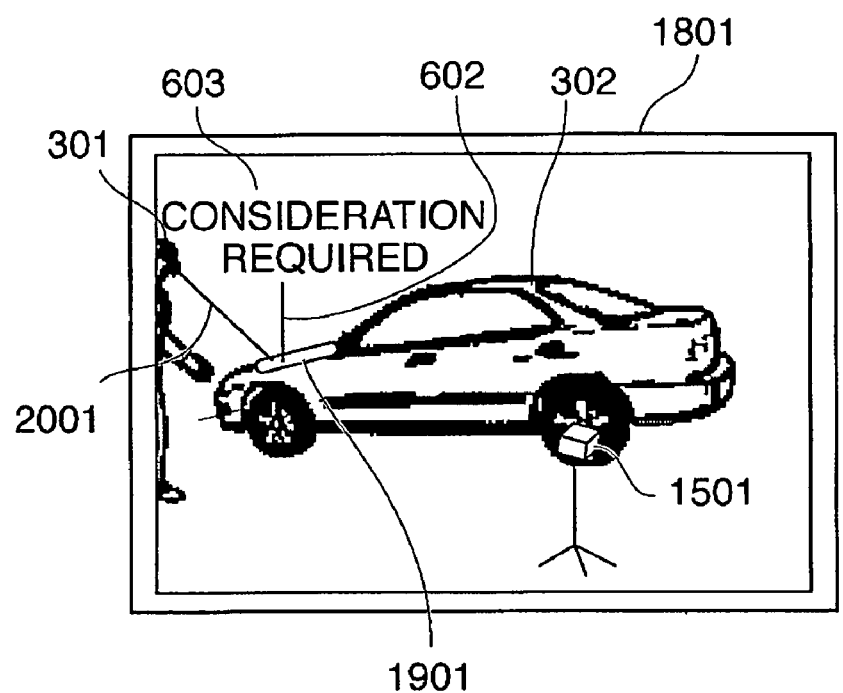
FIG. 25 is a view showing an example of an image displayed on the screen of the display after an input operation.
Figure 26:
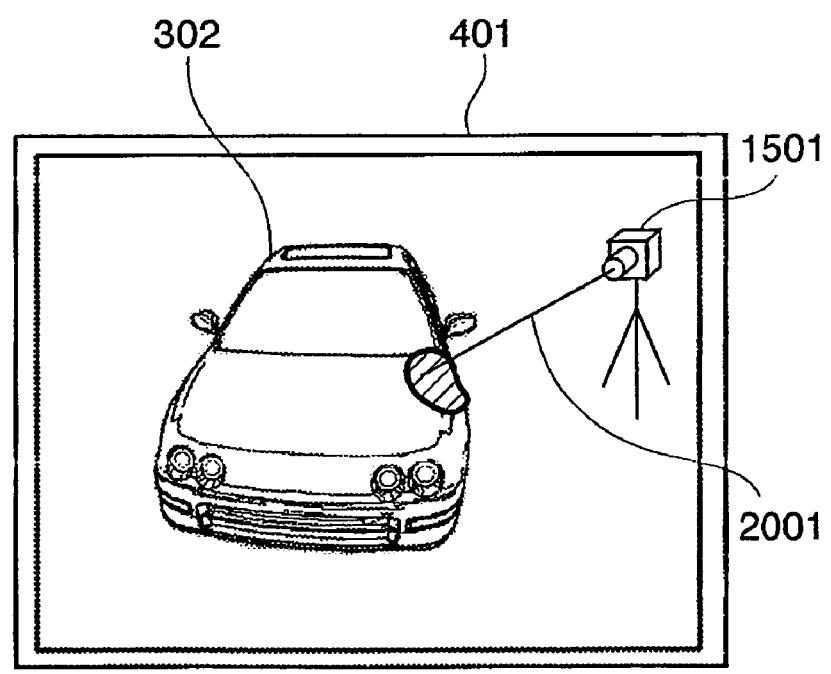
FIG. 26 is a view showing an example of an image displayed on the screen of the display after an input operation.
Figure 27:
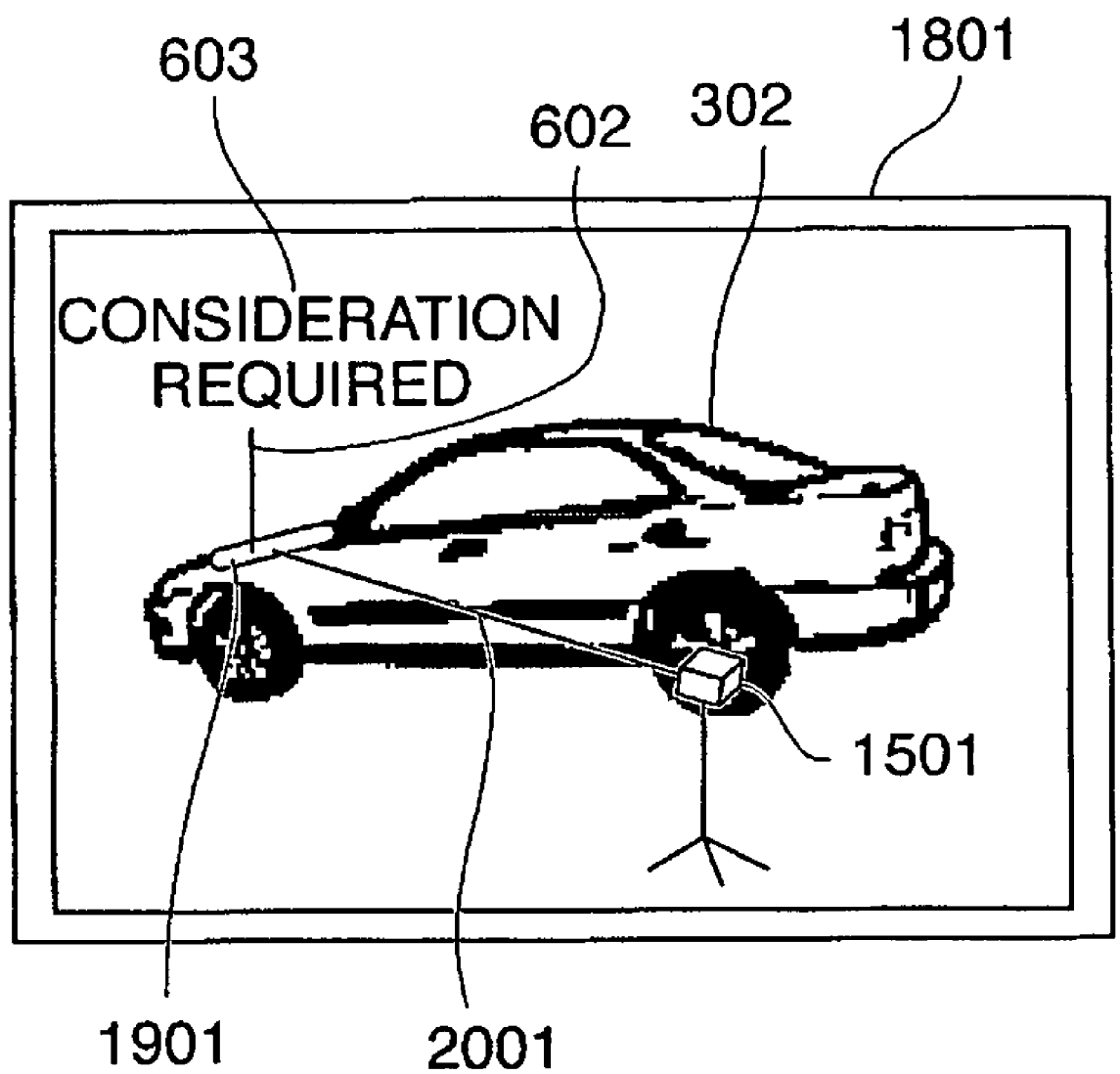
FIG. 27 is a view showing an example of an image displayed on the screen of the display after an input operation.

Although in the fourth embodiment described above, the line segment object 2001 starts from the position of the pointing device 1506 (see FIG. 21), the present invention is not limited to this, but the line segment object 2001 may start from the focal position of the image pickup section 301 of the HMD 101 (see FIGS. 24 and 25) or may start from the focal position of the objective viewpoint camera 1501 (see FIGS. 26 and 27).

To discriminate between a plurality of objective displays, instruction objects may be displayed in different colors. In an eighth embodiment, a plurality of instruction objects are displayed in different colors on one objective display.

In the case where there are a plurality of persons who instruct, a plurality of input devices, a plurality of displays, or a plurality of HMDs or objective cameras, instruction objects may be generated in different colors for the respective persons who instruct, the respective displays, the respective input devices, or the respective HMDs/objective cameras in the step S43, and the instruction objects in different colors generated in the step S43 may be displayed on the displays in the step S45 so that who has given instructions or who has been given instructions can be made clear.

Although in the above described embodiments, a virtual automobile is observed so as to evaluate the design of the automobile, the present invention may be put to other purposes such as entertainment equipment such as games and amusement equipment, simulation equipment for architectural use, medical use, etc. and business-oriented applications such as an assistant in maintenance.

In the above described embodiments, a pointer object 601 and the like displayed in accordance with the indication of a non-HMD wearer 302 can be hidden by using any of the following processes. Namely, there are processes of hiding the pointer object 601 when a predetermined time has elapsed from when the non-HMD wearer indicated the pointer object 601; when the non-HMD wearer again indicates a position near the pointer object 601; when the non-HMD wearer indicates a new different position from the position of the pointer object 601; when the non-HMD wearer operates a cancel key displayed on the screen; and when the HMD wearer 302 carries out a confirmation operation for example to move his/her head up and down.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

This application claims the benefit of Japanese Patent Applications No. 2005-193825 filed Jul. 1, 2005 and No. 2006-162577 filed Jun. 12, 2006, which are hereby incorporated by reference herein in their entirety.

What is claimed is:

1. An image presentation system comprising:
    a first head mounted display that comprises a detecting device that detects a position and orientation of said first head mounted display and presents an image to a user;
    a first drawing device that draws a 3D (three-dimensional) virtual space image seen from a point of view corresponding to the position and orientation of said first head mounted display and displays the 3D virtual space image on said first head mounted display;
    a second drawing device that draws a 3D virtual space image seen from a point of view corresponding to a position and orientation of a third party's point of view and generates the 3D virtual space image;
    a second non-head mounted display that presents a 2D (two-dimensional) image corresponding to the 3D virtual space image generated by said second drawing device to a person who gives an instruction to the user;
    a capture device that captures the 2D image presented by the non-head mounted display on the basis of a first user instruction and acquires the position and orientation of said first display when the 2D image is captured;
    an input device that inputs coordinate values of a 2D position pointed on the captured 2D image on the basis of a second user instruction to the user wearing the first head mounted display after the 2D image has been captured by said capture device; and
    a converting device that converts the coordinate values of the 2D position input by said input device into coordinate values of a 3D position in the 3D virtual space image on the basis of the acquired position and orientation of said first display,
    wherein said first drawing device draws a line segment object being extended from a focal position of an objective viewpoint camera to be displayed on said first head mounted display at the coordinate values of the 3D position in the 3D virtual space image such that the line segment object and the 3D virtual space image are overlapped.

2. An image presentation method using a first head mounted display that comprises a detecting device that detects a position and orientation of the first display and presents an image to a user, and a second non-head mounted display that presents a 2D (two-dimensional) image to a person who gives an instruction to the user, comprising:
    a first drawing step of drawing a 3D (three-dimensional) virtual space image seen from a point of view corresponding to the position and orientation of the first head mounted display and displaying the 3D virtual space image on the first head mounted display;
    a second drawing step of drawing a 3D virtual space image seen from a point of view corresponding to a position and orientation of a third party's point of view and displaying a 2D (two-dimensional) image corresponding to the 3D virtual space image on the second non-head mounted display;
    a capture step of capturing the 2D image presented by the non-head mounted display on the basis of a first user instruction and acquiring the position and orientation of said first display when the 2D image is captured;
    an input step of inputting, after the 2D image has been captured in the capture step, coordinate values of a 2D position pointed on the captured 2D image on the basis of a second user instruction to the user wearing the first head mounted display;
    a converting step of converting the coordinate values of the 2D position input by said input device into coordinate values of a 3D position in the 3D virtual space image on the basis of the acquired position and orientation of said first display,
    wherein, said first drawing step draws a line segment object being extended from a focal position of an objective viewpoint camera to be displayed on the first head mounted display at the coordinate values of the 3D position in the 3D virtual space image such that the line segment object and 3D virtual space image are overlapped.

* * * * *